(12) United States Patent
Moriya et al.

(10) Patent No.: US 11,340,611 B2
(45) Date of Patent: May 24, 2022

(54) AUTONOMOUS BODY SYSTEM AND CONTROL METHOD THEREOF

(71) Applicant: HITACHI, LTD., Tokyo (JP)

(72) Inventors: Toshio Moriya, Tokyo (JP); Takashi Watanabe, Tokyo (JP); Nobutaka Kimura, Tokyo (JP)

(73) Assignee: HITACHI, LTD., Tokyo (JP)

( * ) Notice: Subject to any disclaimer, the term of this patent is extended or adjusted under 35 U.S.C. 154(b) by 255 days.

(21) Appl. No.: 16/669,049

(22) Filed: Oct. 30, 2019

(65) Prior Publication Data

US 2020/0174473 A1 Jun. 4, 2020

(30) Foreign Application Priority Data

Nov. 29, 2018 (JP) ............................. JP2018-223859

(51) Int. Cl.
*G05D 1/00* (2006.01)
*G05D 1/02* (2020.01)
*H04N 7/18* (2006.01)

(52) U.S. Cl.
CPC .......... *G05D 1/0088* (2013.01); *G05D 1/0246* (2013.01); *G05D 1/0287* (2013.01); *H04N 7/181* (2013.01)

(58) Field of Classification Search
CPC ..... G05D 1/0088; G05D 1/0246–0287; H04N 7/181
See application file for complete search history.

(56) References Cited

U.S. PATENT DOCUMENTS

| 2006/0114324 A1* | 6/2006 | Farmer | H04B 7/18506 |
| | | | 348/144 |
| 2007/0021863 A1 | 1/2007 | Mountz et al. | |

(Continued)

FOREIGN PATENT DOCUMENTS

| CN | 103955818 A | 7/2014 |
| DE | 102010051855 B4 | 6/2015 |

(Continued)

OTHER PUBLICATIONS

Chinese Office Action dated Nov. 26, 2020 for Chinese Patent Application No. 201910949154.8.

(Continued)

*Primary Examiner* — Calvin Cheung
(74) *Attorney, Agent, or Firm* — Volpe Koenig

(57) ABSTRACT

An autonomous system including a plurality of autonomous bodies, each of the autonomous bodies includes a situation grasping unit that grasps situation, an operation determining unit that determines an operation based on the grasped situation, and an operation executing unit that executes the determined operation, the plurality of autonomous bodies included in the autonomous body system includes one or more first autonomous bodies and two or more second autonomous bodies, situation grasped by the situation grasping unit of the first autonomous body includes situation of the second autonomous body, the situation grasped by the situation grasping unit of the second autonomous body includes a result of an operation executed by the operation executing unit of the first autonomous body, and the operation determining unit of the second autonomous body determines an operation based on the result of the operation executed by the operation executing unit of the first autonomous body.

12 Claims, 8 Drawing Sheets

(56) References Cited

U.S. PATENT DOCUMENTS

| | | | |
|---|---|---|---|
| 2009/0079839 A1* | 3/2009 | Fischer | G01S 17/86 348/218.1 |
| 2010/0256852 A1* | 10/2010 | Mudalige | G08G 1/22 701/24 |
| 2011/0118874 A1 | 5/2011 | Tanabe et al. | |
| 2014/0342834 A1 | 11/2014 | Tappeiner et al. | |
| 2015/0306768 A1 | 10/2015 | Liang et al. | |
| 2016/0054735 A1* | 2/2016 | Switkes | H04W 4/44 701/23 |
| 2017/0057081 A1 | 3/2017 | Krohne et al. | |
| 2017/0253241 A1* | 9/2017 | Filev | G08G 1/096741 |
| 2018/0169856 A1 | 6/2018 | Murakami et al. | |
| 2018/0231972 A1* | 8/2018 | Woon | G05D 1/0808 |
| 2018/0374366 A1* | 12/2018 | Reimann | G08G 1/22 |
| 2019/0079540 A1* | 3/2019 | Yoon | G05D 1/0276 |
| 2019/0155227 A1 | 5/2019 | Song et al. | |
| 2019/0164420 A1* | 5/2019 | Wendt | G01C 21/3691 |
| 2019/0179339 A1* | 6/2019 | Kim | B60W 30/18163 |
| 2019/0179340 A1* | 6/2019 | Jeong | G08G 1/163 |

FOREIGN PATENT DOCUMENTS

| | | |
|---|---|---|
| DE | 102015216272 A1 | 3/2017 |
| DE | 202014011117 U1 | 2/2018 |
| DE | 102017011361 A1 | 6/2018 |
| DE | 102017223717 B4 | 7/2019 |
| JP | 2006-000954 A | 1/2006 |
| JP | 2015-208811 A | 11/2015 |
| JP | 2019-110742 A | 7/2019 |
| WO | WO-2017222437 A1 * 12/2017 ....... G08G 1/096783 |

OTHER PUBLICATIONS

German Office Action dated May 5, 2020 for the German Patent Application No. 102019217568.6.

Japanese Office Action dated Feb. 1, 2022 for Japanese Patent Application No. 2018-223859.

* cited by examiner

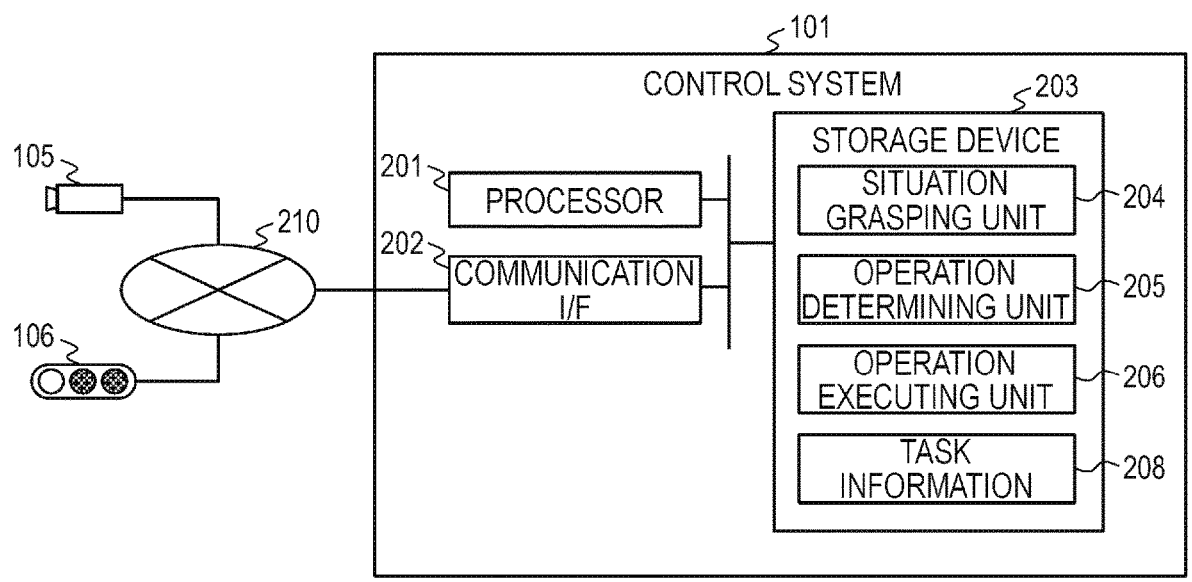
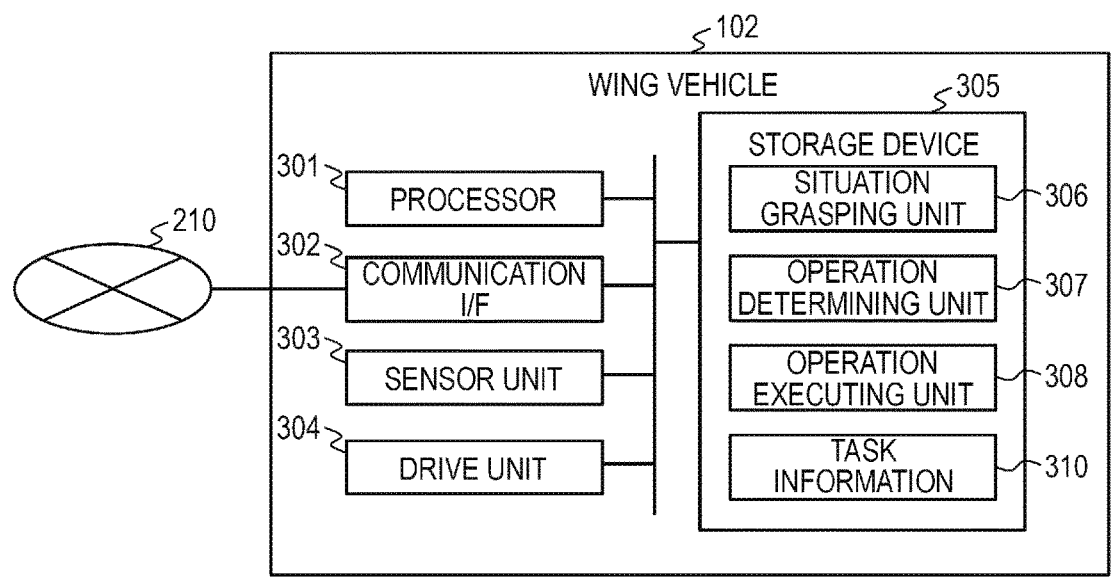

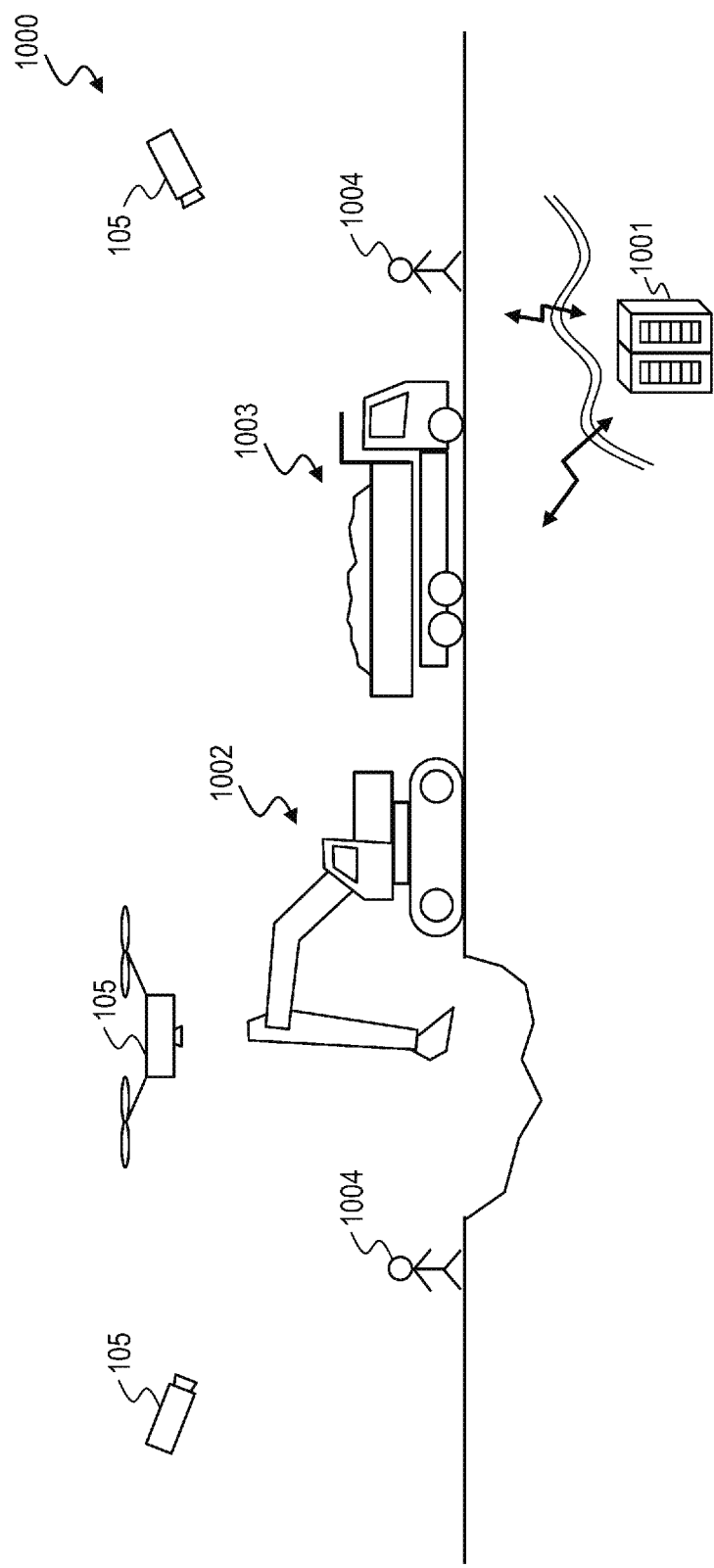

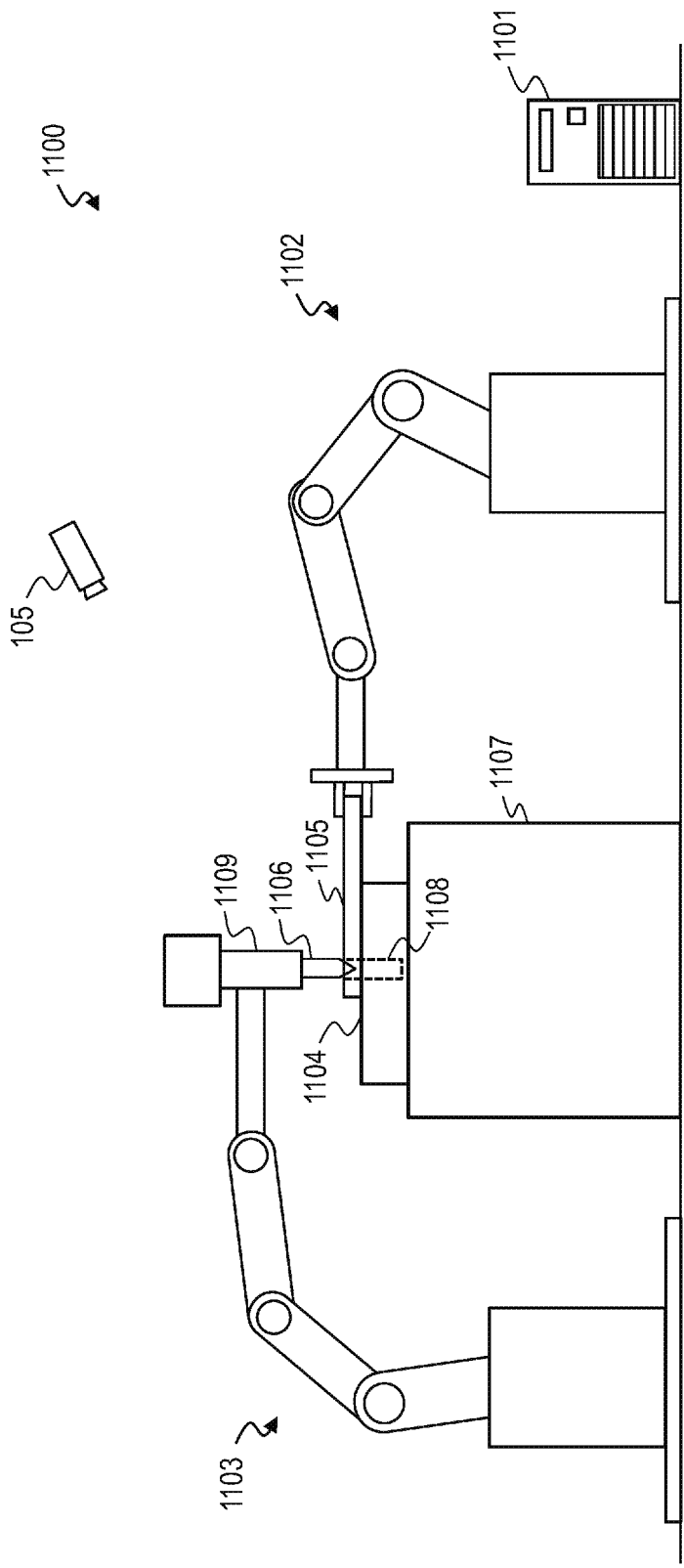

AUTONOMOUS BODY SYSTEM AND CONTROL METHOD THEREOF

CLAIM OF PRIORITY

The present application claims priority from Japanese patent application JP 2018-223859 filed on Nov. 29, 2018, the content of which is hereby incorporated by reference into this application.

BACKGROUND OF THE INVENTION

1. Field of the Invention

The present invention relates to an autonomous body system including a plurality of autonomous bodies.

2. Description of Related Art

As a technique for controlling a system including a plurality of robots, there is a technique disclosed in JP-A-2006-000954 or JP-A-2015-208811, for example.

Regarding a multi-robot system in which a plurality of robots work cooperatively to achieve a specific goal as a whole, JP-A-2006-000954 discloses that "A multi-robot system includes a plurality of robots that are active on a stage, a monitor system that monitors operation of the robots on the stage, and a general controller that operates the plurality of robots. The general controller performs an instruction for operating the robots, an instruction for correcting the position and direction of the robots, and an instruction of operating the robots when an abnormality occurs (or is predicted) based on the state of the robot and the monitored position and direction, in real time via a wireless LAN."

Regarding optimization of an operation program of a robot system including a plurality of robots, JP-A-2015-208811 discloses that "A simulation device includes a simulation unit that executes an operation program including a command speed of a drive axis, a command acceleration, and an operation-waiting command by simulation, a storage unit that stores a line number of an operation program and the command speed and the command acceleration at the line number in association with each other in time series, an execution time calculation unit that calculates the execution time of the operation program for each line number stored in the storage unit based on an simulation result executed by the simulation unit, and a wait time calculation unit that calculates the operation-waiting time according to an operation-waiting command based on the execution time calculated by the execution time calculation unit."

In a robot system described in JP-A-2006-000954, each robot needs to include an interface suitable for communication with a controller in order to receive instructions from the controller. For the controller to control each robot, it is necessary to integrate information, guarantee consistency, and guarantee synchronization as necessary. When there is a change in the robot specification or a robot with a new specification is added, it may be necessary to change the information on the controller side or the interface accordingly.

In a simulation device described in JP-A-2015-208811 above, in order to simulate an operation program of a robot system, it is necessary to grasp the specifications of each robot in advance, and when the specifications are changed or a robot with a different specification is added, it is necessary to update the information of a simulation device accordingly.

SUMMARY OF THE INVENTION

In order to solve at least one of the above problems, a representative example of the invention disclosed in the present application is an autonomous body system including a plurality of autonomous bodies, in which each of the plurality of autonomous bodies includes a situation grasping unit that grasps situation, an operation determining unit that determines an operation based on the grasped situation, and an operation executing unit that executes the determined operation, in which the plurality of autonomous bodies included in the autonomous body system includes one or more first autonomous bodies and two or more second autonomous bodies, situation grasped by the situation grasping unit of the first autonomous body includes situation of the second autonomous body, the situation grasped by the situation grasping unit of the second autonomous body includes a result of an operation executed by the operation executing unit of the first autonomous body, and the operation determining unit of the second autonomous body determines an operation based on the result of the operation executed by the operation executing unit of the first autonomous body.

According to one aspect of the present invention, it is not necessary for each subordinate autonomous body (second autonomous body) to explicitly include an interface against a superior autonomous body (first autonomous body). Therefore, connection of the subordinate autonomous body and the superior autonomous body becomes easy regardless of model and manufacturer of the autonomous bodies. Since it is not necessary to integrate information on each autonomous body in advance or to guarantee the consistency and synchronization thereof, the robustness of the operation is increased. When the specifications of subordinate autonomous bodies change or when subordinate autonomous bodies with new specifications are added, since the superior autonomous body can adapt without performing any special work, the autonomous body system can be continuously updated.

Problems, configurations, and effects other than those described above will become apparent from the following description of examples.

BRIEF DESCRIPTION OF THE DRAWINGS

FIG. 2 is a block diagram illustrating a configuration of a control system in the autonomous body system;

FIG. 3 is a block diagram illustrating a configuration of a wing vehicle in the autonomous body system;

FIG. 10 is an explanatory diagram illustrating an overall configuration of an autonomous body system according to Example 4 of the present invention; and FIG. 11 is an explanatory diagram illustrating an overall configuration of an autonomous body system according to Example 5 of the present invention.

DESCRIPTION OF EMBODIMENTS

Example 1

Figure 1:
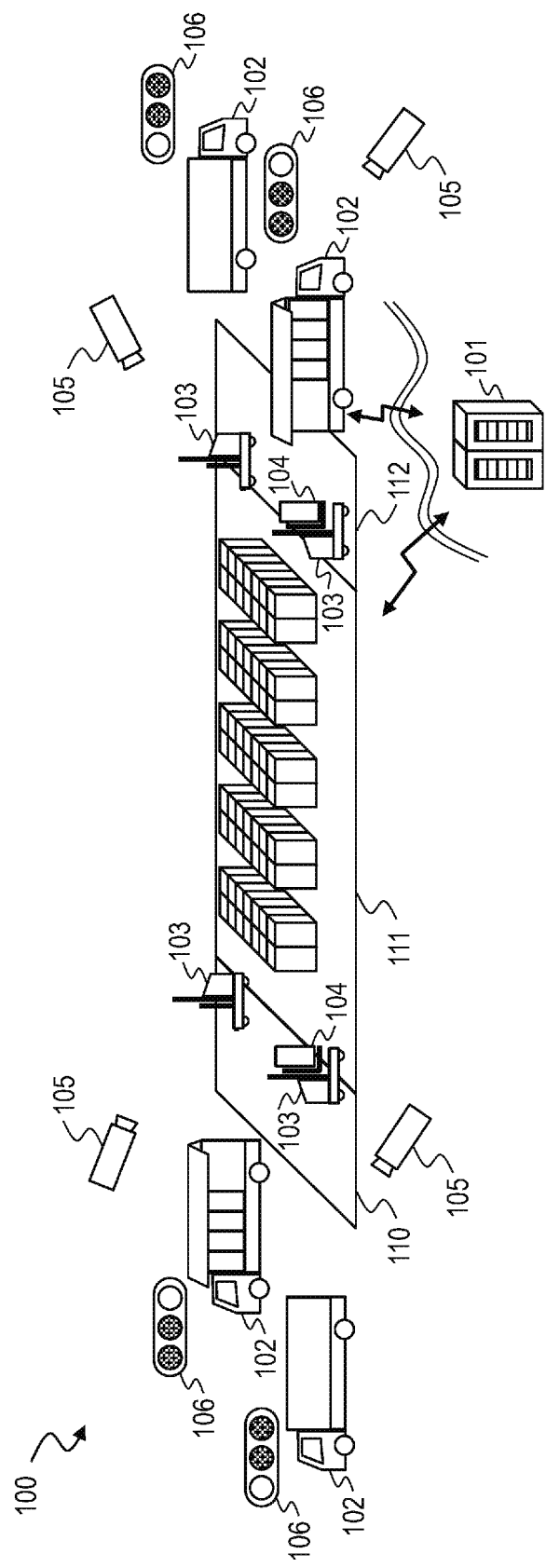
FIG. 1 is an explanatory diagram illustrating an overall configuration of an autonomous body system according to Example 1 of the present invention.

FIG. 1 is an explanatory diagram illustrating an overall configuration of an autonomous body system 100 according to Example 1 of the present invention.

The autonomous body system 100 according to Example 1 is an automatic pallet unloading system from a wing vehicle by an autonomous forklift in a distribution warehouse. The autonomous body system 100 includes one or more wing vehicles 102, one or more forklifts 103, and a control system 101 as autonomous bodies.

Here, the autonomous body is a general term for objects that grasp situation, determine, and operate by oneself. For example, the wing vehicle 102 and the forklift 103 that autonomously operate based on sensor information and the like, and the control system 101 that performs autonomous determination based on the sensor information and outputs the result are autonomous bodies. In Example 1, such an autonomous body will be mainly described. However, even the wing vehicle 102 and the forklift 103 that are driven by a person can be handled as an autonomous body that operates according to the result of the person's own understanding and determination. For example, if there is a person in the warehouse who carries and sorts articles, the person himself or herself may also be treated as an autonomous body that acts autonomously by grasping the situation based on a result of sensing by visual and auditory senses and making a determination by using intelligence of the person.

The warehouse includes an arrival area 110, an inventory area 111, and a shipping area 112. When the wing vehicle 102 arrives in the arrival area 110, the forklift 103 lowers a pallet 104 loaded with articles and carries the forklift 103 to the inventory area 111. The articles conveyed to the inventory area 111 may be stored while being loaded on the pallet 104, or may be lowered from the pallet 104 and stored on a shelf. A shelf for storing articles may be fixed in the inventory area 111, or may be movable by an automatic transport vehicle (not illustrated).

The forklift 103 carries out the necessary pallet 104 from the inventory area 111 to the shipping area 112 according to a shipping order and loads the pallet 104 onto the wing vehicle 102 that arrived at the shipping area 112. After the pallet 104 is loaded, the wing vehicle 102 leaves the shipping area 112 and conveys the articles to a next delivery destination.

Although omitted in FIG. 1 for simplicity of description, an actual warehouse generally includes an area for temporarily placing the pallet 104 (or pallet to be loaded on the wing vehicle 102 from now on) lowered from the wing vehicle 102, an area for unloading articles loaded on the pallet 104, an area for picking, sorting, and inspecting articles according to a shipping order, and an area for loading the articles to be shipped on the pallet, and the like.

The control system 101 is a superior (or first type) autonomous body that grasps the status of each wing vehicle 102 and each forklift 103 in the warehouse and outputs information for controlling the wing vehicles 102 and the forklifts 103. This is a process for acquiring information related to the entire autonomous body system and optimizing the entire system, and this may be called global knowledge. On the other hand, each wing vehicle 102 and each forklift 103 are subordinate autonomous bodies that autonomously determine an operation thereof while using information output from the control system 101 as necessary. Each of the wing vehicles 102 and the forklifts 103 acquires information on the surroundings thereof and operates autonomously and may be called an autonomous piece.

In the example of FIG. 1, one or more cameras 105 that can communicate with the control system 101 and one or more traffic lights 106 that can communicate with the control system 101 are provided in the warehouse. Each camera 105 captures an image of the inside of the warehouse and transmits data of the captured image to the control system 101. Each traffic signal 106 is provided, for example, in the arrival area 110 or the shipping area, and outputs some signal according to the information transmitted from the control system 101. The control system 101 may communicate with each forklift 103.

The control system 101 may be provided either inside or outside the warehouse (including remote areas) as long as the control system 101 can communicate with the camera 105, a traffic light 106, the forklift 103, and the like.

FIG. 2 is a block diagram illustrating a configuration of the control system 101 in the autonomous body system 100.

The control system 101 is a computer including a processor 201, a communication interface (I/F) 202, and a storage device 203.

The processor 201 executes various types of processes according to the program stored in the storage device 203. The communication interface 202 is connected to a network 210 and communicates with the camera 105, the traffic light 106, the forklift 103, and the like (as well as the wing vehicle 102 when the wing vehicle 102 has a communication function with the control system 101) via the network 210.

The storage device 203 may be, for example, a combination of a main storage device such as a dynamic random-access memory (DRAM) and an auxiliary storage device such as a hard disk drive or a flash memory. The storage device 203 stores a situation grasping unit 204, an operation determining unit 205, an operation executing unit 206, and task information 208.

The situation grasping unit 204, the operation determining unit 205, and the operation executing unit 206 are programs executed by the processor 201. In the following description, the processes executed by each of the above units are actually performed by the processor 201 controlling the communication interface 202, the camera 105, the traffic light 106, and the like as necessary according to the program stored in the storage device 203.

For example, the imaging function of the camera 105 and the function of the processor 201 grasping the situation from the image captured by the camera 105 according to the program of the situation grasping unit 204 may be handled as the function of the situation grasping unit 204. In other words, the camera 105 may be considered as a part of the situation grasping unit 204. Similarly, the traffic signal 106 may be considered as a part of the operation executing unit 206. The processes of each unit will be described later.

The task information 208 is information related to a task to be executed by the control system 101. For example, when the control system 101 according to Example 1 controls the wing vehicle 102 and the forklift 103 in the warehouse, the task information 208 may include a shipping order including the type, quantity, shipping destination, and the like of articles to be shipped from the warehouse.

The camera 105 is an optical camera that captures an image of the inside of the warehouse. If necessary for grasping the situation of the warehouse, the camera 105 for capturing an image of the outside of the warehouse may be installed. The camera 105 captures an image of the inside of the warehouse and transmits the image data to the control system 101 via the network 210. The situation grasping unit 204 grasps the situation of the warehouse (for example, the position of the pallet 104 in each area in the warehouse, the position and state of each wing vehicle 102 and each forklift 103, and the like) based on the image data.

The camera 105 is an example of a sensor that acquires information for the control system 101 to grasp the situation of the warehouse. As a sensor, instead of the camera 105 (or in addition to the camera 105), a radar or a laser imaging detection and ranging (LIDAR) may be used. For example, a beacon may be used for the control system 101 to grasp the position of each wing vehicle 102 and each forklift 103. Here, beacon signal receivers are installed at various locations in the warehouse and connected to the network 210. A plurality of cameras 105 may be installed in the warehouse, or a plurality of types of sensors may be installed.

For example, the traffic light 106 may output a blue color signal for permitting progress, and a yellow or red color signal for instructing stop in the same manner as a traffic signal. The traffic light 106 is installed, for example, in the arrival area 110 and the shipping area 112, and is used to present information such as permission or stop of the progress to the wing vehicle 102. The traffic light 106 may output any color signal according to the signal transmitted from the control system 101 via the network 210. Alternatively, the traffic light 106 may display information such as progress and stop by a signal including a figure, a symbol, or a character instead of the color signal. The traffic light 106 may display information instructing opening and closing of the wings of the wing vehicle 102. Alternatively, instead of (or in addition to) the traffic light 106, a device that outputs an audio signal including the above information may be used.

The network 210 may be of any type as long as the network 210 enables communication between the control system 101 and the wing vehicle 102, the forklift 103, the camera 105, and the traffic light 106. For example, the network 210 may include a wide area network when the control system 101 is in a remote location or may include a wireless network to communicate with the moving forklift 103 or the like.

FIG. 3 is a block diagram illustrating a configuration of the wing vehicle 102.

The wing vehicle 102 is a vehicle that conveys the pallet 104 loaded with articles. Here, although a wing vehicle (that is, a truck type vehicle in which the side plate and ceiling of the cargo bed part jumps up) in which a pallet can be easily loaded and unloaded by the forklift 103 has been illustrated, other types of vehicles may be used.

The wing vehicle 102 includes a processor 301, a communication interface 302, a sensor unit 303, a drive unit 304, and a storage device 305.

The processor 301 executes various types of processes according to the program stored in the storage device 305. The communication interface 302 is connected to the network 210 and communicates with the control system 101. However, the wing vehicle 102 may not have a communication function with the control system 101. Here, the wing wheel 102 may not include the communication interface 302.

The sensor unit 303 acquires information for grasping the situation around the wing vehicle 102. The sensor unit 303 may include, for example, an optical camera, a radar, LIDAR, or the like or may include an audio sensor such as a microphone. The wing vehicle 102 may include a plurality of sensor units 303 or may include a plurality of types of sensor units 303.

The drive unit 304 has functions such as traveling of the wing wheel 102 and opening and closing of the wings. The drive unit 304 includes, for example, a motor such as an internal combustion engine or an electric motor, a transmission device that transmits power generated by the motor to wheels or wings, a steering device for causing the wing vehicle 102 to travel in a desired direction, and the like.

The storage device 305 may be a combination of a main storage device such as DRAM and an auxiliary storage device such as a hard disk drive or a flash memory. The storage device 305 stores a situation grasping unit 306, an operation determining unit 307, an operation executing unit 308, and task information 310.

The situation grasping unit 306, the operation determining unit 307, and the operation executing unit 308 are programs executed by the processor 301. In the following description, the processes executed by each of the above units are actually performed by the processor 301 controlling the communication interface 302, the sensor unit 303, the drive unit 304, and the like as necessary according to the program stored in the storage device 305.

For example, the sensing function of the sensor unit 303 and the function of the processor 301 grasping the situation according to the program of the situation grasping unit 306 based on the information sensed by the sensor unit 303 are handled as the function of the situation grasping unit 306. In other words, the sensor unit 303 may be considered as a part of the situation grasping unit 306. When the information received by the communication interface 302 is used for grasping the situation, the communication interface 302 may be considered as a part of the situation grasping unit 306. Similarly, the drive unit 304 may be considered as a part of the operation executing unit 308.

The wing vehicle 102 of the present example has a self-driving function for performing self-driving without a driver or a driving support function for supporting a driving of the driver. At least a part of the situation grasping unit 306, the operation determining unit 307, and the operation executing unit 308 may be implemented as at least a part of the self-driving function or the driving support function.

Although omitted in FIG. 3, the storage device 305 may further store map data or the like referred to by the self-driving function or the driving support function.

The task information 310 is information regarding a task to be executed by the wing vehicle 102. For example, the task information 310 may include information on a warehouse or a shipping destination to which the wing vehicle 102 is supposed to go next.

Figure 4:
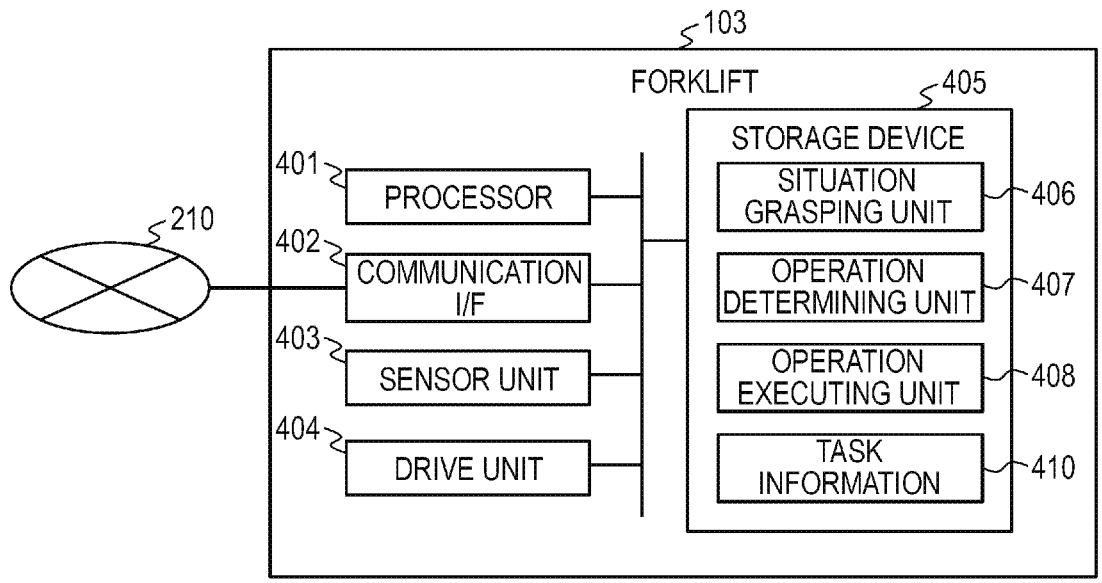
FIG. 4 is a block diagram illustrating a configuration of a forklift in the autonomous body system.

FIG. 4 is a block diagram illustrating a configuration of the forklift 103.

The forklift 103 is a vehicle that unloads the pallet 104 from the wing vehicle 102, transports the pallet 104 between the arrival area 110, the inventory area 111, and the shipping area 112, and loads the pallet 104 into the wing vehicle 102.

The forklift 103 includes a processor 401, a communication interface 402, a sensor unit 403, a drive unit 404, and a storage device 405.

The processor 401 executes various types of processes according to the program stored in the storage device 405. The communication interface 402 is connected to the network 210 and communicates with the control system 101.

The sensor unit 403 acquires information for grasping the situation around the forklift 103. The sensor unit 403 may include, for example, an optical camera, a radar, LIDAR, or the like or may include an audio sensor such as a microphone. The forklift 103 may include a plurality of sensor units 403 or may include a plurality of types of sensor units 403. Specifically, the sensor unit 403 may include a sensor for detecting surrounding objects for traveling of the forklift 103, a sensor for measuring the positional relationship between the forklift and the pallet 104, and the like.

The drive unit 404 has a function of traveling the forklift 103 and raising and lowering the pallet 104 by the fork. The drive unit 404 includes, for example, a motor such as an internal combustion engine or an electric motor, a transmission device that transmits power generated by the motor to wheels or fork, a steering device for causing the forklift 103 to travel in a desired direction, and the like.

The storage device 405 may be, for example, a combination of a main storage device such as DRAM and an auxiliary storage device such as a hard disk drive or flash memory. The storage device 405 stores a situation grasping unit 406, an operation determining unit 407, an operation executing unit 408, and task information 410.

The situation grasping unit 406, the operation determining unit 407, and the operation executing unit 408 are programs executed by the processor 401. In the following description, the processes executed by each of the above units are actually performed by the processor 401 controlling the communication interface 402, the sensor unit 403, the drive unit 404, and the like as necessary according to the program stored in the storage device 405.

For example, the sensing function of the sensor unit 403 and the function of the processor 401 grasping the situation according to the program of the situation grasping unit 406 based on the information sensed by the sensor unit 403 may be handled as the function of the situation grasping unit 406. In other words, the sensor unit 403 may be considered as a part of the situation grasping unit 406. When the information received by the communication interface 402 is used for situation grasping, the communication interface 402 may be considered as a part of the situation grasping unit 406. Similarly, the drive unit 404 may be considered as a part of the operation executing unit 408.

The forklift 103 according to the present example has a self-driving function that performs self-driving without a driver or a driving support function that supports a driving of the driver. At least a part of the situation grasping unit 406, the operation determining unit 407, and the operation executing unit 408 may be implemented as at least a part of the self-driving function or the driving support function.

Although omitted in FIG. 4, the storage device 405 may further store map data of the warehouse or the like referred to by the self-driving function or the driving support function.

The task information 410 is information related to tasks that the forklift 103 is to execute. For example, the task information 410 may include information indicating the pallet 104 to be transported by the forklift 103 and the transport destination thereof.

Figure 5:
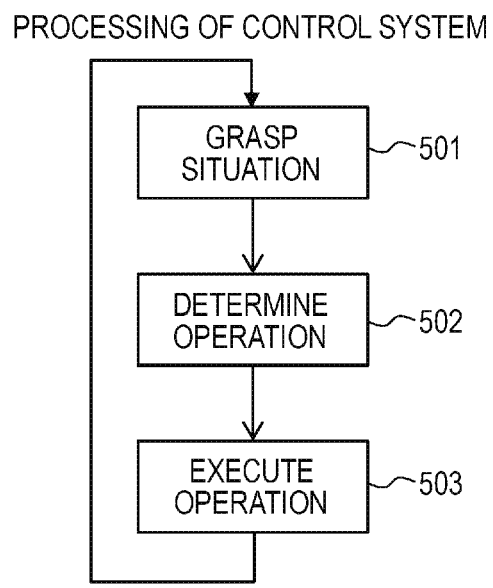
FIG. 5 is a flowchart illustrating a process executed by the control system.

FIG. 5 is a flowchart illustrating a process executed by the control system 101.

First, the situation grasping unit 204 of the control system 101 grasps the situation of the warehouse (step 501). For example, the situation grasping unit 204 may grasp the arrangement of the pallet 104, the position and state (for example, whether traveling, where the parked location is, whether the wings are opened, and the like) of each wing vehicle 102, and the position and state (for example, whether traveling, whether the pallet 104 is loaded, and the like) of each forklift 103 in each area in the warehouse by performing image recognition of the image data transmitted from each camera 105.

Next, the operation determining unit 205 of the control system 101 determines the operation of the control system 101 (step 502). Specifically, when the situation grasped by the situation grasping unit 204 is input, the operation determining unit 205 determines the operation of the control system 101 based on the input situation. Here, the operation of the control system 101 is, for example, transmission of a signal to each traffic light 106 and transmission of an instruction to each forklift 103. For example, the operation determining unit 205 may grasp or predict arrival of the wing vehicle 102 at the arrival area or the shipping area, and opening and closing of the wings based on the situation grasped by the situation grasping unit 204 and determine timing when the forklift 103 goes to pick up (or goes to load) the pallet 104 based on the grasp and prediction thereof. Alternatively, the operation determining unit 205 may grasp the situation where the unloading of the articles from the wing vehicle 102 or the loading of the articles into the wing vehicle 102 is completed and the forklift 103 is separated from the loading platform, and determine timing when the wing vehicle 102 closes the wings and departs.

Specifically, for example, the operation determining unit 205 may receive situation grasped by the situation grasping unit 204, store a function that outputs an operation to be executed, and execute step 502 using the function. The function may be anything, and may be implemented by a neural network, for example.

Next, the operation executing unit 206 of the control system 101 executes the determined operation (step 503). For example, when a signal (for example, a signal indicating progress or stop of the wing vehicle 102, opening and closing of the wings, and the like) to be displayed by each traffic signal 106 is determined in step 502, the operation executing unit 206 transmits an instruction to display the determined signal to each traffic signal 106 via the communication interface 202 and the network 210. When the information (for example, the destination of each forklift 103, identification information of the pallet to be transported, and the like) to be transmitted to each forklift 103 is determined in step 502, the operation executing unit 206 transmits the determined information to each forklift 103 via the communication interface 202 and the network 210.

Thereafter, the process returns to step 501, and steps 501 to 503 are repeatedly executed.

The operation determining unit 205 may perform a learning process for optimizing the operation determination at any timing (for example, when it is determined that a sufficient amount of data that can be used for learning is accumulated). For example, the operation determining unit 205 may store the key performance indicator (KPI) set in the control system 101 and change the parameters of the function so that the value is improved (that is, a value indicating high evaluation).

Here, an example of the learning process executed by the operation determining unit 205 will be described. The KPI set in the control system 101 (that is, parameters for evaluating the performance of the control system 101) is, for example, the throughput of the entire warehouse or sales.

For example, the operation determining unit 205 may change the parameters of the function used in step 502 to improve the KPI (for example, to increase throughput or sales) based on the KPI after the operation determined in step 502 is executed. By using the function learned as such, in step 502, an operation that improves the KPI is determined.

Figure 6:
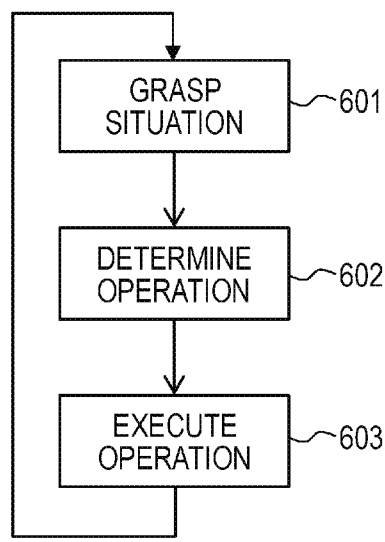
FIG. 6 is a flowchart illustrating a process executed by the wing vehicle.

FIG. 6 is a flowchart illustrating a process executed by the wing vehicle 102.

First, the situation grasping unit 306 of the wing vehicle 102 grasps the situation around the wing vehicle 102 (step 601). For example, the situation grasping unit 306 may identify the objects around the wing vehicle 102, the situation of the arrival area 110 or the shipping area 112 where the wing vehicle 102 unloads or loads the articles, and the display contents of the traffic light 106 visible from the wing vehicle 102 based on the information acquired by the sensor unit 303.

Next, the operation determining unit 307 of the wing vehicle 102 determines the operation of the wing vehicle 102 (step 602). Specifically, when the situation grasped by the situation grasping unit 306 is input, the operation determining unit 307 determines the operation of the wing vehicle 102 based on the input situation. Here, the operation of the wing vehicle 102 includes, for example, traveling, stopping and steering for parking in the arrival area 110 or the shipping area 112 and leaving the area, and opening and closing of the wings.

Specifically, for example, the operation determining unit 307 may receive situation grasped by the situation grasping unit 306, store a function that outputs an operation to be executed, and execute step 602 using the function. The function may be anything, but may be implemented by a neural network, for example.

Next, the operation executing unit 308 of the wing vehicle 102 executes the determined operation (step 603). For example, when it is determined in step 602 that the wing vehicle 102 is to be traveled, stopped, steered, or the wings are to be opened or closed, the operation executing unit 308 transmits an instruction to execute the determined operation to the drive unit 304.

Thereafter, the process returns to step 601, and steps 601 to 603 are repeatedly executed.

The operation determining unit 307 may perform a learning process for optimizing the operation determination at any timing. For example, the operation determining unit 307 may store the KPI set in the wing vehicle 102 and change the parameters of the function so that the value is improved (that is, a value indicating high evaluation).

Here, an example of the learning process executed by the operation determining unit 307 will be described. The KPI (that is, a parameter for evaluating the performance of the wing vehicle 102) set in the wing vehicle 102 is set, for example, such that the evaluation becomes higher as the staying time of the wing vehicle 102 in the warehouse is shorter. The operation determining unit 307 may change the parameter of the function used in step 602 to improve the KPI (for example, to shorten the staying time) based on the KPI calculated after the operation determined in step 602 is executed, for example.

More specifically, for example, the operation determining unit 307 inputs surrounding situation grasped by the situation grasping unit 306 based on information acquired by the sensor unit 303 into a function and determines an operation based on the output. Here, the grasped surrounding situation includes the recognition result of the display contents of the signal of the traffic light 106 output to the wing vehicle 102 in addition to the recognition result of the objects around the wing vehicle 102 and the like. The display contents of the traffic signal 106 is an operation result of the control system 101 and instructs the operation that the wing vehicle 102 needs to perform determined by the control system 101 to improve the KPI of the control system 101.

However, executing such an instruction from the control system 101 as it is does not necessarily improve the KPI of the wing vehicle 102. This is because, for example, the situation of the warehouse that can be acquired by the control system 101 and the surrounding situation that can be acquired by the wing vehicle 102 do not necessarily match due to differences in the type and installation position of the sensor used, and the control system 101 does not know KPI of the wing vehicle 102. The KPI set in the wing vehicle 102 is generally different from that set in the control system 101. Different KPIs may be set in each of a plurality of wing vehicles 102.

Therefore, for example, the operation determining unit 307 may change the parameters used in step 602 by changing the weight given to each of the result of recognizing the operation result of the control system 101 in the surrounding situation and other situations so that the KPI set in the wing vehicle 102 is improved. By using the function learned in this way, in step 602, an operation that improves the KPI is determined.

Figure 7:
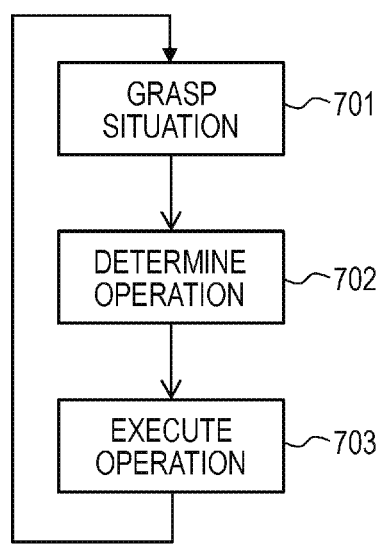
FIG. 7 is a flowchart illustrating a process executed by the forklift.

FIG. 7 is a flowchart illustrating a process executed by the forklift 103.

First, the situation grasping unit 406 of the forklift 103 grasps the situation around the forklift 103 (step 701). For example, the situation grasping unit 406 may identify the objects around the forklift 103, the situation of the loading platform of the wing vehicle, the situation of the pallet on the loading platform, the situation of the arrival area and shipping area, and the operation result of the control system 101 based on the information acquired by the sensor unit 403 and the information received from the control system 101 by the communication interface 402.

Next, the operation determining unit 407 of the forklift 103 determines the operation of the forklift 103 (step 702). Specifically, when the situation grasped by the situation grasping unit 406 is input, the operation determining unit 407 determines the operation of the forklift 103 based on the input situation. Here, the operation of the forklift 103 includes, for example, movement to the position of the pallet, insertion and lifting of the fork claws to the pallet, movement to the transport destination of the pallet, and operation to place the pallet at the transport destination.

Specifically, for example, the operation determining unit 407 may receive situation grasped by the situation grasping unit 406, store a function that outputs an operation to be executed, and execute step 702 using the function. The function may be anything, but may be implemented by a neural network, for example.

Next, the operation executing unit 408 of the forklift 103 executes the determined operation (step 703). For example, when it is determined in step 702 that the forklift 103 is to be traveled, stopped, steered, or the fork is to be raised or lowered, the operation executing unit 408 transmits an instruction to execute the determined operation to the drive unit 404.

Thereafter, the process returns to step 701, and steps 701 to 703 are repeatedly executed.

The operation determining unit 407 may perform a learning process for optimizing the operation determination at any timing. For example, the operation determining unit 407 may store the KPI set in the forklift 103 and change the parameters of the function so that the value is improved (that is, a value indicating high evaluation).

Here, an example of the learning process executed by the operation determining unit 407 will be described. The KPI (that is, a parameter for evaluating the performance of the forklift 103) set in the forklift 103 is set, for example, such that the evaluation becomes higher as the forklift 103 operates more efficiently or more reliably. The efficiency of work may be measured by, for example, the work amount per unit time (the amount of articles conveyed or the movement distance, and the like). The certainty of work may be measured by, for example, the number of emergency stops per unit time.

The operation determining unit 407 may change the parameter of the function used in step 702 to improve the KPI (for example, to improve the work efficiency) based on the KPI calculated after the operation determined in step 702 is executed, for example.

More specifically, for example, the operation determining unit 407 inputs the surrounding situation grasped by the situation grasping unit 406 based on the information acquired by the sensor unit 403 and the information received via the communication interface 402 to the function and determines an operation based on the output. Here, the grasped surrounding situation includes information transmitted from the control system 101 to the forklift 103 in addition to the recognition result of the objects around the forklift 103 and the like. The information transmitted from the control system is the operation result of the control system 101. For example, the control system 101 instructs an operation that the forklift 103 determines to perform in order to improve the KPI of the control system 101.

However, executing such an instruction from the control system 101 as it is does not necessarily improve the KPI of the forklift 103. This is because, for example, the situation of the warehouse that can be acquired by the control system 101 and the surrounding situation that can be acquired by the forklift 103 do not necessarily match due to differences in the type and installation position of the sensor used, and the control system 101 does not know KPI of the forklift 103. The KPI set in the forklift 103 is generally different from that set in the control system 101. Different KPIs may be set in each of the plurality of forklifts 103.

Therefore, for example, the operation determining unit 307 may change the parameters used in step 702 by changing the weight given to each of the result of recognizing the operation result of the control system 101 in the surrounding situation and other situations so that the KPI set in the forklift 103 is improved. By using the function learned in this way, in step 702, an operation that improves the KPI is determined.

The control system 101, the wing wheel 102, and the forklift 103 each learn a function in a manner as illustrated in FIGS. 5 to 7, and even if each does not know each other's KPI, each operation can be determined so that each KPI is improved.

For example, the control system 101 provides information to the wing vehicle 102 and the forklift 103 so that the KPI (for example, the throughput of the warehouse) is improved based on the situation of the warehouse grasped from the image captured by the camera 105. For example, when the control system 101 recognizes that the wing vehicle 102 arrived at the arrival area 110, the control system 101 may transmit information that instructs to go to the arrival area 110 for unloading to each forklift 103.

The forklift 103 that received the information determines an operation thereof so that the KPI (for example, work efficiency) set for itself is improved based on the information, the surrounding situation grasped through the own sensor unit 403, and task information 410. As a result, the forklift 103 may move to the arrival area 110 according to the instruction included in the received information or may perform other operations without following.

For example, when the forklift 103 is already transporting another pallet 104, the forklift 103 may continue to transport the pallet 104 without following the instruction. If the current location of the forklift 103 is far from the arrival area 110, the forklift 103 may determine that it is not appropriate to follow the instruction to improve the KPI set for itself and perform another operation without following the instruction.

Alternatively, for example, a plurality of types of forklifts 103 are used in a warehouse, and the conditions (for example, weight and the like) of the pallet 104 that can be transported may differ depending on the types. In such a case, if the forklift 103 obtains information on the articles loaded on the wing vehicle 102, when the arrived wing vehicle 102 is loaded with pallets that cannot be transported by itself, the forklift 103 may determine not to unload the articles from the wing vehicle 102 even if the forklift 103 receives an instruction from the control system 101.

Alternatively, for example, when the control system 101 detects congestion of the forklifts 103 in a specific area from an image in the warehouse, in order to eliminate the congestion and improve the KPI, the control system 101 may transmit an instruction to move away from the area to the forklifts 103 involved in the congestion. The forklift 103 that received the instruction may move according to the instruction or may determine not to follow the instruction when the forklift 103 determines that the KPI of the forklift 103 is to be deteriorated by following the instruction.

Therefore, the instruction from the control system 101 to the forklift 103 is not necessarily followed, but gently acts on the determination of the operation of the forklift 103.

Similarly, the wing vehicle 102 may determine to perform an operation according to the instruction from the control system 101 received via the traffic light 106 or may determine to perform an operation contrary to the instruction to improve the KPI set for itself.

As described above, when the control system 101 determines an operation thereof and executes the operation (in other words, determines the contents of the instruction for each subordinate autonomous body and sends the content), a certain autonomous body may perform an operation according to the instruction, and another certain autonomous body may perform an operation contrary to the instruction. As a result, the state in the warehouse changes. The control system 101 grasps the changed situation in the warehouse and calculates the KPI value. The control system 101 may learn a parameter of a function for determining an operation from the grasped situation so that the KPI value is improved, based on the situation grasped earlier, an operation determined based on the situation, and the KPI value calculated based on the situation after the operation is executed.

For example, the initial control system 101 may instruct all forklifts 103 to move to the arrival area 110 when the wing vehicle 102 arrives at the arrival area 110. However, as a result of learning, it is considered that the control system 101 can easily transmit a movement instruction to the forklift 103 that is not transporting the pallet 104 and the forklift 103 near the arrival area 110 or to the forklift 103 that matches the conditions of the pallet loaded on the wing vehicle 102 that arrived.

Therefore, even though the control system 101 does not know the characteristics (including KPI) of each subordinate autonomous body in advance, by working gently on each autonomous body and learning the results, the control system 101 can issue instructions that can be easily accepted by each subordinate autonomous body according to the KPI set for each subordinate autonomous body. As a result, the operation of each autonomous body can be determined to contribute to the improvement of the KPI of the control system 101 (that is, the entire autonomous body system 100) and also to the improvement of the KPI of each autonomous body.

In order to perform such learning, the control system 101 may transmit, at a certain rate, instructions that intentionally deteriorate the KPI value set for itself or instructions that each autonomous body is expected not to accept.

On the other hand, for the subordinate autonomous bodies, for example, the forklift 103 may perform an operation according to the instruction to improve the KPI thereof according to the surrounding situation acquired from the sensor unit 403 and the instruction from the control system 101 received by the communication interface 402 or may perform an operation contrary to the instruction. After performing the determined operation, the forklift 103 calculates the KPI value set for itself based on the situation in which the operation is reflected. The forklift 103 may learn a parameter of a function for determining an operation from the grasped situation so that the KPI value is improved, based on the situation grasped earlier, an operation determined based on the situation, and the KPI value calculated based on the situation after the operation is executed.

Here, the parameters of the function may include a weight given to each of the situation grasped via the sensor unit 403 and an instruction from the control system 101. In order to perform such learning, the forklift 103 may determine an operation that intentionally deteriorates the KPI value set for itself.

The wing vehicle 102 is the same as the forklift 103 described above.

As described above, even if each of the superior and subordinate autonomous bodies does not grasp the characteristics of other autonomous bodies by learning (in other words, even if the subordinate autonomous body seen from the superior autonomous body is a black box), it is possible to determine the behavior of each autonomous body so that the KPI of each autonomous body is improved and the KPI as a whole is also improved. As a result, it is not necessary to integrate the entire information or to guarantee the consistency and synchronization of the whole, and a robust operation is realized. Even if an unknown subordinate autonomous body is added or the characteristics of an existing subordinate autonomous body change, the superior autonomous body can adapt thereto, enabling continuous evolution of the autonomous body system.

If an information transmission means such as the traffic signal 106 is used, the subordinate autonomous body does not need to explicitly include an interface against the superior autonomous body. Therefore, it is possible to easily connect, for example, a variety of autonomous bodies (for example, autonomous body with a manufacturer different from other autonomous bodies) that were not initially present.

In the above example, an instruction to the wing vehicle 102 is transmitted via the traffic light 106, and an instruction to the forklift 103 is transmitted via the communication interface 402. In the present example, the wing vehicle 102 may not include the communication interface 302. As a result, it is possible to transmit information from the control system 101 to the forklift 103 without determining a detailed communication procedure in advance.

However, such an information transmission method is merely an example. For example, information transmission to the wing vehicle 102 may be performed via the communication interface 302. Alternatively, a traffic signal similar to the traffic signal 106 may be provided at various locations in the warehouse, and information transmission to the forklift 103 may be performed via the traffic signal.

In the above example, both the wing vehicle 102 and the forklift 103 have a self-driving function or a driving support function, but at least a part of the wing vehicle 102 and the forklift 103 may not have any of the self-driving function and the driving support function. For example, any one of the wing vehicle 102 may not include the processor 301, the communication interface 302, the sensor unit 303, and the storage device 305. Here, the driver (that is, a human) of the wing vehicle 102 operates the drive unit 304 to control the traveling of the wing vehicle 102 and the opening and closing of the wings. The communication interface 302 and the sensor unit 303 are replaced by a driver's sensory organs (for example, eyes and ears). The functions of the situation grasping unit 306, the operation determining unit 307, and the operation executing unit 308 are replaced by the driver's intelligence.

Even here, the driver can receive an instruction from the control system 101 by referring to the traffic light 106. Therefore, the KPI set in the wing vehicle 102 may be, for example, that the driver wants to finish his or her work quickly or surely perform the work.

Similarly, the forklift 103 may be driven by a human. Here, an instruction from the control system 101 may be transmitted via a traffic light, or an instruction received via the communication interface 402 may be displayed on a display unit (not illustrated) of the forklift 103, and the driver may receive the instruction by viewing the instruction.

The autonomous body system of Example 1 includes a plurality of wing vehicles 102 and a plurality of forklifts 103 as subordinate autonomous bodies, but may actually include only one or another autonomous body. For example, when a robot that picks up an article is installed in a warehouse, the robot may be added as a second type autonomous body. Alternatively, if an automated transport vehicle is used to transport a shelf for storing articles in the inventory area 111 to a picking area or the like, such an automated transport vehicle may be added as a second type autonomous body. Here, the second type autonomous body is also set with some KPI like the wing vehicle 102 and the forklift 103 and executes the same process as described above.

The plurality of wing vehicles 102 may include, for example, a plurality of types of vehicles with different manufacturers, and different KPIs may be set for each. The same applies to the plurality of forklifts 103.

According to Example 1 above, information that is determined to be effective for improving the KPI of the control system 101 is provided to the subordinate autonomous bodies (for example, wing vehicle 102 and forklift 103) according to the situation of the warehouse grasped by the control system 101 via the camera 105 or the like. Thereby, for example, timing at which the forklift 103 accesses the loading platform of the wing vehicle 102 can be accurately known according to the actual situation of the wing vehicle 102 and the surroundings thereof. Therefore, the waiting time of the forklift 103 is reduced, and the work time for unloading and loading is shortened. It is possible to accurately know timing at which the wing vehicle 102 departs according to the actual situation of unloading and loading of articles. Therefore, the stop time of the vehicle wheel 102 is shortened.

In an autonomous body system in which there is no superior autonomous body such as the control system 101 and subordinate autonomous bodies exchange information directly, it is difficult to obtain the above-described effects for the following reasons. In other words, in a system without a superior autonomous body, each wing vehicle 102 and each forklift 103 determines an operation for improving the set KPI based on the information acquired by the own sensor thereof. However, since only information within a limited range can be obtained from each sensor, there is a difference between the acquired information and the actual warehouse situation, and as a result, the KPI may not be improved.

On the other hand, according to the present example, since the control system 101 can grasp the situation of the entire warehouse (that is, the entire autonomous body system) and notify an operation of each autonomous body that is desirable to improve the overall KPI based on the grasped situation, the overall KPI can be improved.

In order to directly exchange information between the wing vehicle 102 and the forklift 103, it is necessary to determine a communication means for each other in advance. However, in fact, it is actually difficult to determine a communication means in advance because administrators may be different in a case where the forklift 103 is managed by the warehouse owner, while the wing vehicle 102 is managed by a shipping company, and the like, for example. However, according to the present example, for example, by using information transmission means such as the traffic light 106, it is possible to provide necessary information without determining a communication means in advance.

Example 2

Next, Example 2 of the present invention will be described. Except for the differences described below, each unit of the autonomous body system of Example 2 has the same functions as each unit denoted by the same reference numerals of Example 1 illustrated in FIGS. 1 to 7, and description thereof will be omitted.

Figure 8:
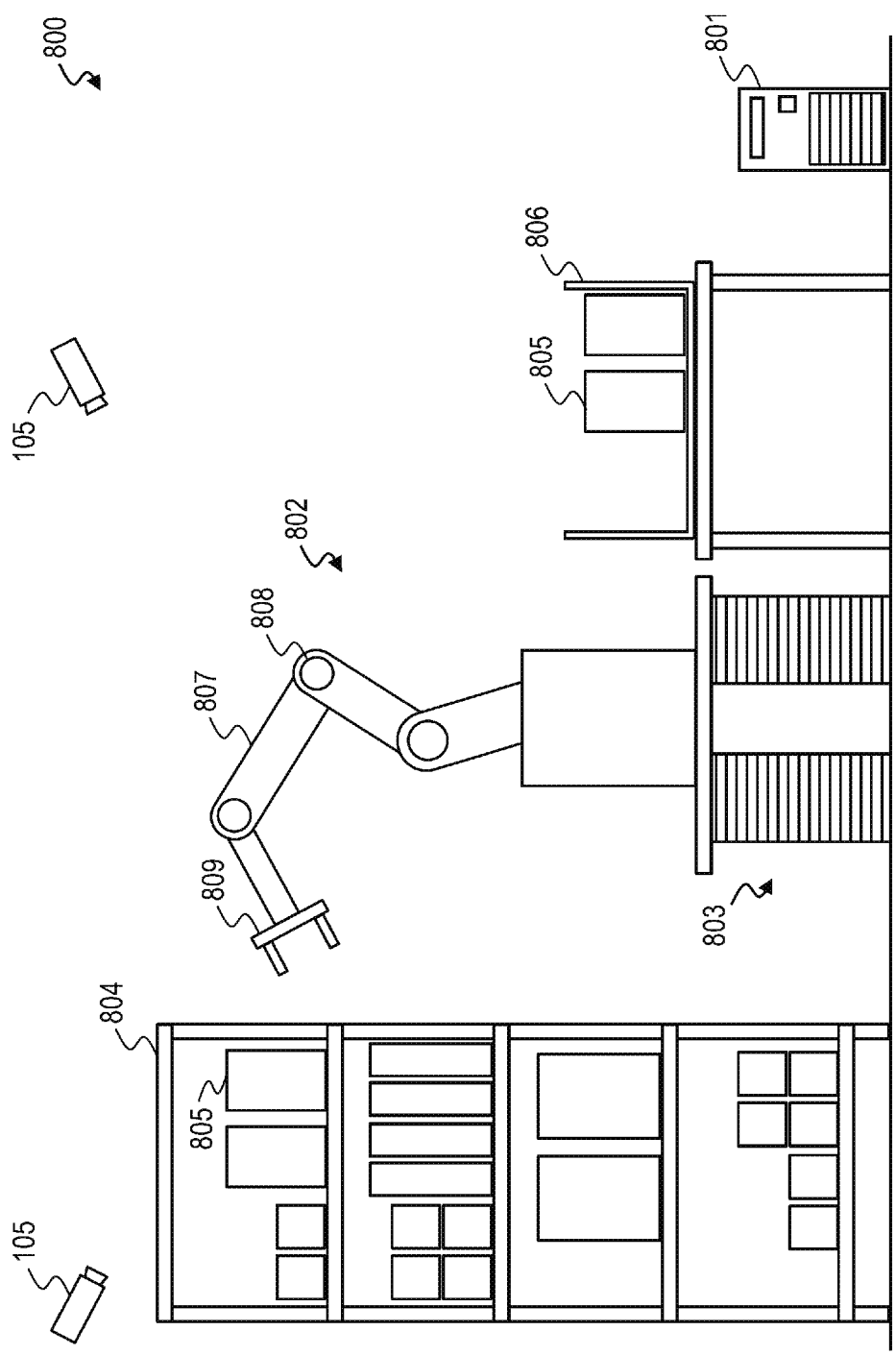
FIG. 8 is an explanatory diagram illustrating an overall configuration of an autonomous body system according to Example 2 of the present invention.

FIG. 8 is an explanatory diagram illustrating an overall configuration of an autonomous body system 800 according to Example 2 of the present invention.

The autonomous body system 800 according to Example 2 is a robot system that performs a picking operation of taking out an article 805 stored in a shelf 804 and packing the article 805 in a sorting box 806. The autonomous body system 800 includes an arm/lifter integrated management system 801, an arm robot 802, and a lifter 803 as autonomous bodies.

The arm robot 802 is, for example, a vertical articulated robot, takes out the article 805 stored in the shelf 804, and packs the article 805 into the box 806. Therefore, the arm robot 802 grasps the situation of the article 805 loaded on the shelf 804 as surrounding situation. In order to grasp the situation, a sensor (for example, a camera) installed on the arm robot 802 is used. Determination of the operation of the arm robot 802 is performed by the intelligence of the arm robot 802 (for example, the operation determining unit 307 of the arm robot 802 described later).

The configuration of the arm robot 802 is the same as that of the wing vehicle 102 of Example 1 in FIG. 3 or the forklift 103 of Example 1 illustrated in FIG. 4 except for the following differences. Here, the configuration of the arm robot 802 will be described with reference to FIG. 3.

The communication interface 302 of the arm robot 802 communicates with the arm/lifter integrated management system 801 via the network 210. The sensor unit 303 of the arm robot 802 is a camera attached to the arm robot 802, for example. Based on an image obtained by capturing an image in the direction of the shelf 804 by the camera, the situation grasping unit 306 of the arm robot 802 grasps the situation of the article 805 loaded on the shelf 804. The situation grasping unit 306 of the arm robot 802 grasps a message (for example, information indicating that the lifter 803 is lifted to a desired height, which will be described later) transmitted from the arm/lifter integrated management system 801.

The drive unit 304 of the arm robot 802 includes a motor (not illustrated) that drives a joint 808 of an arm 807 of the arm robot 802 and a hand unit 809 at the tip of the arm 807.

The task information 310 includes, for example, information for identifying an article to be taken out by the arm robot 802. The operation determining unit 307 determines an operation of each joint 808 and the hand unit 809 for taking out a desired article 805, for example, based on the information obtained from the arm/lifter integrated management system 801 acquired via the communication interface 302, the state grasped from the result of sensing by the sensor unit 303, and the task information 310. Then, the operation executing unit 308 executes the determined operation via the drive unit 304.

The operation determining unit 307 may perform a learning process for optimizing the operation determination at any timing. The flow of these kinds of process is the same as that of the wing vehicle 102 illustrated in FIG. 6. The KPI set in the arm robot 802 is, for example, work efficiency.

The lifter 803 has a function of moving the arm robot 802 to an arbitrary height within a predetermined range. Therefore, the lifter 803 grasps the situation of the shelf 804 as surrounding situation. In order to grasp the situation, a sensor (for example, a camera) installed on the lifter 803 is used. The operation of the lifter 803 is determined by the intelligence of the lifter 803 (for example, the operation determining unit 407 of the lifter 803 described later).

The configuration of the lifter 803 is the same as the configuration of the wing vehicle 102 of Example 1 illustrated in FIG. 3 or the forklift 103 of Example 1 illustrated in FIG. 4 except for the following differences. Here, the configuration of the lifter 803 will be described with reference to FIG. 4.

The communication interface 402 of the lifter 803 communicates with the arm/lifter integrated management system 801 via the network 210. The sensor unit 403 of the lifter 803 is a camera attached to the lifter 803, for example. The situation grasping unit 406 grasps the situation of the shelf 804 based on an image obtained by capturing an image in the direction of the shelf 804 by the camera. The situation grasping unit 406 of the lifter 803 grasps a message (for example, information indicating a height at which the arm robot 802 is to be lifted, which will be described later) transmitted from the arm/lifter integrated management system 801. The drive unit 404 of the lifter 803 includes a motor (not illustrated) that drives the lifter 803 in the vertical direction.

The task information 410 may include, for example, information indicating the position of a shelf in which an article to be taken out by the arm robot 802 is stored. The operation determining unit 407 determines an appropriate height of the lifter 803 for the arm robot 802 to take out a desired article 805, for example, based on the information obtained from the arm/lifter integrated management system 801 acquired via the communication interface 402, the state grasped from the result of sensing by the sensor unit 403, and the task information 410. Then, the motion executing unit 408 performs the determined operation (for example, lifting the arm robot 802 to a determined height) via the drive unit 304.

The operation determining unit 407 may perform a learning process for optimizing the operation determination at any timing. The flow of these kinds of process is the same as that of the forklift 103 illustrated in FIG. 7. The KPI set in the lifter 803 is, for example, a smaller number of movements in the vertical direction (that is, the evaluation is higher as the number of movements in the vertical direction is smaller).

The arm/lifter integrated management system 801 is a computer that communicates with and manages the arm robot 802 and the lifter 803. The configuration of the arm/lifter integrated management system 801 is the same as the configuration of the control system 101 of Example 1 illustrated in FIG. 2 except for the following differences. Here, the configuration of the arm/lifter integrated management system 801 will be described with reference to FIG. 2.

The communication interface 202 of the arm/lifter integrated management system 801 communicates with the arm robot 802 and the lifter 803 via the network 210. One or more cameras 105 are connected to the network 210. However, the camera 105 may be directly connected to the arm/lifter integrated management system 801, not via the network 210. Each camera 105 may capture an image of the entire autonomous body system 800, a predetermined part of the autonomous body system 800, or the surroundings of the autonomous system 800 (for example, the shelf 804 and the article 805). The camera 105 is an example of a sensor for grasping the situation of the autonomous body system 800, and other types of sensors may be used.

The situation grasping unit 204 grasps the situation of the autonomous body system 800 based on the image captured by the camera 105. The situation grasped here is, for example, the situation of the shelf 804, the situation of the article 805 stored in the shelf 804, the situation of the arm robot 802, and the situation of the lifter 803.

The task information 208 may include, for example, information for identifying an article to be taken out by the arm robot 802, information indicating the position of a shelf in which the article is stored, and the like. Based on the situation grasped from the image captured by the camera 105 and the task information 208, the operation determining unit 205 grasps the position of the target article 805 on the shelf 804. Then, the operation determining unit 205 determines an appropriate height of the lifter 803 (that is, a height at which the arm robot 802 is to be lifted) for the arm robot 802 to take out the target article 805. The operation executing unit 206 transmits the determined height via the communication interface 202 to the lifter 803. Subsequently, the operation executing unit 206 notifies the arm robot 802 that the lifter 803 lifted the arm robot 802 to the determined height.

The arm robot 802 performs an operation of grasping the target article 805. As a result, when the target article 805 cannot be grasped, the situation grasping unit 204 grasps the situation according to the information from the camera 105. The operation determining unit 205 determines that the height of the lifter 803 is not appropriate based on the grasped information and determines a more appropriate height of the lifter 803, and the operation executing unit 206 transmits the height to the lifter 803.

The operation determining unit 205 may perform a learning process for optimizing the operation determination at any timing. The flow of these kinds of process is the same as that of the control system 101 illustrated in FIG. 5. The KPI set in the arm/lifter integrated management system 801 is, for example, work efficiency of the autonomous body system 800 as a whole.

The autonomous body system 800 of the present example may be part of a larger autonomous body system. For example, the autonomous body system 800 according to Example 2 may be incorporated in the warehouse of the autonomous body system 100 according to Example 1 as a robot that picks articles from a shelf. Here, the arm/lifter integrated management system 801 of Example 2 operates as a superior autonomous body of the arm robot 802 and the lifter 803 and operates as a subordinate autonomous body of the control system 101.

In the above example, the arm robot 802 is treated as one subordinate autonomous body, but the arm robot 802 may actually be an autonomous body system composed of a superior autonomous body and a subordinate autonomous body. For example, the subordinate autonomous body includes a sensor unit that grasps the situation of each joint 808, an operation determining unit that determines an operation based on information obtained from the sensor unit, and a drive unit that drives the joint according to the determined operation. On the other hand, the superior autonomous body may include a sensor unit that grasps the entire arm robot 802 and the surroundings thereof, a motion determining unit that determines an operation based on information obtained from the sensor unit, and an operation executing unit that transmits the determined operation to each joint 808.

Thus, the autonomous body system to which the present invention is applied may include three or more layers. Even here, as described in Example 1 and Example 2 above, it is possible to perform an operation that improves the KPI of the entire autonomous body system while improving the KPI of each autonomous body by determining an operation of each autonomous body from the acquired information acquired by each autonomous body based on the results of each autonomous body learning to improve the KPI set for each autonomous body. Such an autonomous body system can be constructed as a flexible system in which a superior autonomous body can adapt even if the configuration of subordinate autonomous bodies changes without the need for detailed arrangements of interfaces between superior and subordinate autonomous bodies and prior information integration.

According to Example 2 above, the arm/lifter integrated management system 801 provides information that is determined to be effective for improving the KPI of the arm/lifter integrated management system 801 to the subordinate autonomous bodies (for example, arm robot 802 and lifter 803) according to the situation of the warehouse grasped by the arm/lifter integrated management system 801 via the camera 105 or the like. As such, for example, the lifter 803 is able to know to what height the arm robot 802 is to be lifted, which the lifter 803 itself cannot determine. The arm robot 802 is able to know in advance in which position the target article 805 is placed. Therefore, it is easy to find the target article 805 when the arm robot 802 is lifted by the lifter 803. In other words, time for finding the target article 805 can be shortened and the target article 805 can be found reliably.

In an autonomous system in which there is no superior autonomous body such as the arm/lifter integrated management system 801 and subordinate autonomous bodies exchange information directly, it is difficult to obtain the above-described effects for the following reasons. That is, in a system without a superior autonomous body, the lifter 803 cannot know the state of the upper stage of the shelf 804 via the sensor unit 403 in a state where the arm robot 802 is not lifted yet. Similarly, the arm robot 802 that is not yet lifted cannot grasp the article in the shelf via the sensor unit 303.

On the other hand, according to the present example, since the arm/lifter integrated management system 801 can grasp the entire autonomous body system 800 and the surroundings thereof and notify an operation of each autonomous body that is desirable to improve the overall KPI based on the grasped situation, the overall KPI can be improved.

Example 3

Next, Example 3 of the present invention will be described. Except for the differences described below, each unit of the autonomous body system of Example 3 has the same functions as each unit denoted by the same reference numerals of Example 1 illustrated in FIGS. 1 to 7, and description thereof will be omitted.

Figure 9:
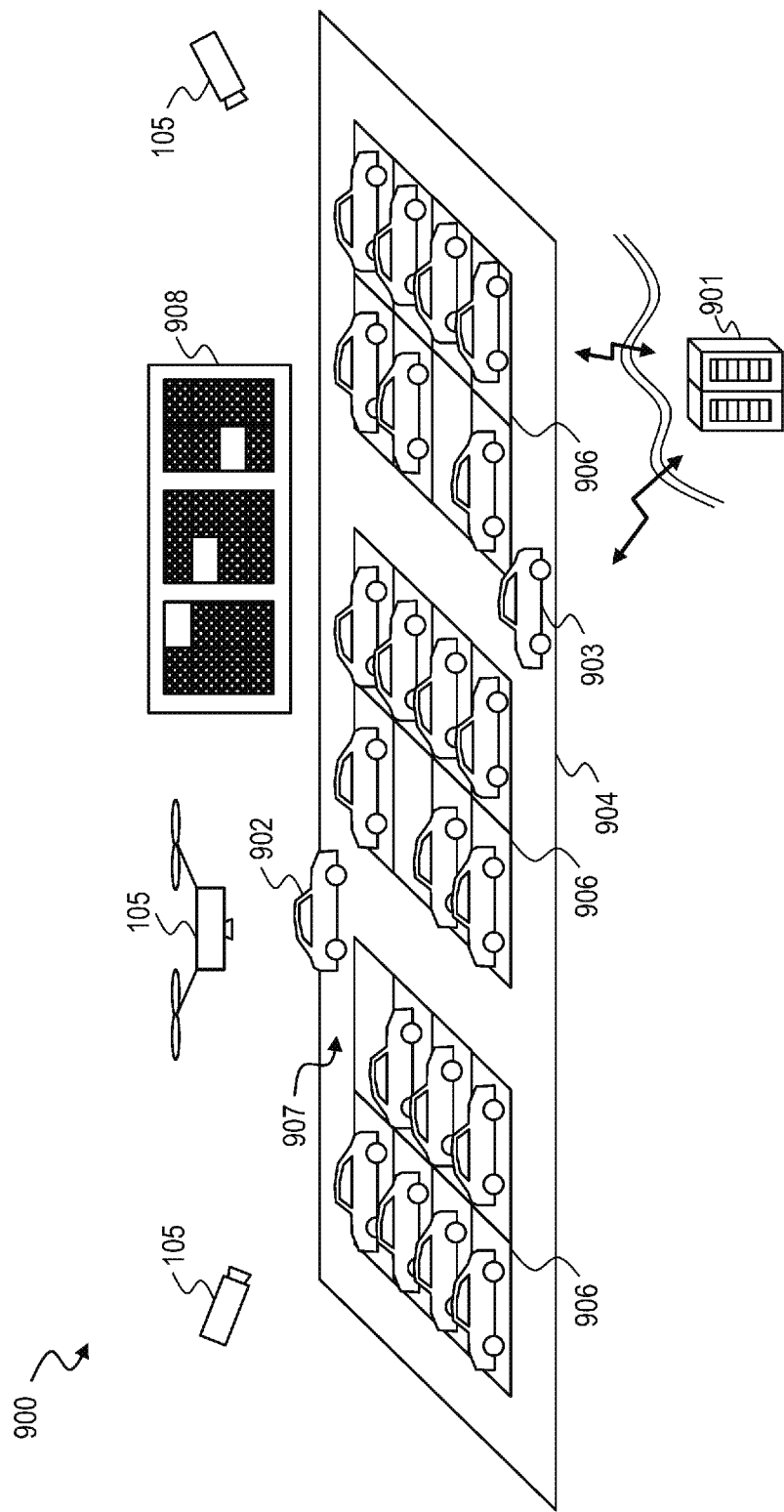
FIG. 9 is an explanatory diagram illustrating an overall configuration of an autonomous body system according to Example 3 of the present invention.

FIG. 9 is an explanatory diagram illustrating the overall configuration of an autonomous system 900 according to Example 3 of the present invention.

The autonomous body system 900 of Example 3 is a parking lot system including a self-driving vehicle 902 and a parking lot control system 901 that controls a vehicle 903 driven by a person and a parking lot 904 used by the person as autonomous bodies.

The parking lot control system 901 monitors where the vehicle (for example, including one or more self-driving vehicles 902 and one or more the vehicle 903 driven by a person) is traveling at what speed and how the vehicle is occupying the road (that is, an area for the vehicle to move in other than the parking area 906) in the parking lot in the large parking lot 904. The parking lot control system 901 monitors which sections of the parking area 906 are empty. Then, the parking lot control system 901 grasps the above-described monitoring result and performs gradual control on the self-driving vehicle 902 and the vehicle 903 driven by the person.

In the parking lot 904, for example, one or more guidance bulletin boards 908 are provided. The guidance bulletin boards 908 are an example of means for transmitting information from the parking lot control system 901 to the self-driving vehicle 902 and the vehicle 903 driven by a person.

The configuration of the self-driving vehicle 902 is the same as the configuration of the wing vehicle 102 of Example 1 illustrated in FIG. 3 except for the following differences. Here, the configuration of the self-driving vehicle 902 will be described with reference to FIG. 3.

The communication interface 302 of the self-driving vehicle 902 communicates with the parking lot control system 901 via the network 210. The sensor unit 303 of the self-driving vehicle 902 is, for example, a camera or a distance sensor that is attached to the self-driving vehicle 902 and captures an image of the surroundings of the self-driving vehicle 902. Here, an example of a camera will be described. The situation grasping unit 306 of the self-driving vehicle 902 grasps the situation around the own vehicle in the parking lot 904 based on the image captured by the camera.

The situation grasping unit 306 of the self-driving vehicle 902 grasps information (for example, the situation in the parking lot 904, information on the destination section and the route to the destination, and the like) transmitted from the parking lot control system 901. The situation grasping unit 306 may grasp the information transmitted from the parking lot control system 901 by information (for example, the result of recognizing the display contents of the guidance bulletin board 908) acquired by the camera or the like of the sensor unit 303 or may grasp from the information acquired via the communication interface 302.

The driving unit 304 of the self-driving vehicle 902 includes, for example, a motor such as an internal combustion engine or an electric motor, a transmission device that transmits power generated by the motor to wheels, a steering device for causing the self-driving vehicle 902 to travel in a desired direction, and the like.

The task information 310 includes, for example, information such as searching for a section where parking is possible and moving a vehicle there. The operation determining unit 307 determines an operation such as progress, stop, and an amount of steering based on the information from the parking lot control system 901, the state grasped from the result of sensing by the sensor unit 303, and the task information 310, which are acquired via the communication interface 302 or the sensor unit 303, for example. Then, the operation executing unit 308 executes the determined operation via the drive unit 304.

The operation determining unit 307 may perform a learning process for optimizing the operation determination at any timing. The flow of these kinds of process is the same as that of the wing vehicle 102 illustrated in FIG. 6. The KPI set in the self-driving vehicle 902 is, for example, that the consumption of fuel (or electric power) is to be minimized, or that it is desired to indicate a section where a vehicle can be parked and a route to the section.

The self-driving vehicle 902 may have a complete self-driving function capable of traveling without requiring a human operation or may have a driving support function for supporting a part of human driving. As in the case of the wing vehicle 102 of Example 1, at least some of the functions of the situation grasping unit 306, the operation determining unit 307, and the operation executing unit 308 may be implemented as at least a part of the self-driving function or the driving support function.

The configuration of the vehicle 903 driven by a person is the same as that of the self-driving vehicle 902 except for the following differences. That is, the vehicle 903 driven by a person may not include the processor 301, the communication interface 302, the sensor unit 303, and the storage device 305. Functions corresponding to the situation grasping unit 306, the operation determining unit 307, and the operation executing unit 308 in the self-driving vehicle 902 are replaced by the driver's intelligence in the vehicle 903 driven by a person. The task information 310 is remembered by the driver. The sensor unit 303 is replaced by the driver's sensory organs (for example, eyes and ears).

The KPI set in the vehicle 903 driven by a person may be the same as that set in the self-driving car 902, but instead, for example, the KPI may be that it is not desired to indicate a section where a vehicle can be parked and a route to the section or it is desired to park near a person's exit or park in the shade.

The parking lot control system 901 is a computer that monitors the inside of the parking lot 904 and performs gradual control on the self-driving vehicle 902 and the vehicle 903 driven by a person. The configuration of the parking lot control system 901 is the same as the configuration of the control system 101 of Example 1 illustrated in FIG. 2 except for the following differences. Here, the configuration of the parking lot control system 901 will be described with reference to FIG. 2.

One or more cameras 105 each capturing at least a part of the parking lot 904 are connected to the network 210. Each camera 105 may be a fixed camera installed in an appropriate place or may be a camera that moves like a drone with a camera. The camera 105 is an example of a sensor for grasping the situation of the autonomous body system 900, and other types of sensors may be used.

The guidance bulletin board 908 is connected to the network 210. The guidance bulletin board 908 is an example of the information transmission means for the parking lot control system 901 to control each vehicle. As another example of such information transmission means, there are traffic lights and the like provided in various places in the parking lot 904, and the like.

The situation grasping unit 204 grasps the situation of the autonomous body system 900 based on the image captured by the camera 105. The grasped situation here is, for example, situation such as where each vehicle is traveling at what speed and how the vehicle occupies the road in the parking lot.

The task information 208 includes, for example, information for guiding a vehicle that entered the parking lot 904 to an empty section in the parking lot 904, and guiding a vehicle that exited from any section to the exit of the parking lot 904. The operation determining unit 205 determines the control of each vehicle so that traffic jams do not occur in the parking lot 904 and each vehicle can be parked near a current position faster, and the operation executing unit 206 executes the control based on the situation of the parking lot 904 grasped from the image captured by the camera 105 (for example, the situation of each vehicle in the parking lot 904) and the task information 208. The control is performed, for example, by displaying information on the guidance bulletin board 908. When the vehicle can receive information via the communication interface 302 connected to the network 210, the operation executing unit 206 may transmit control information via the communication interface 202 and the network 210.

Although FIG. 9 illustrates only one guide bulletin board 908, a plurality of guide bulletin boards 908 may actually be installed in the parking lot 904. Here, all the guidance bulletin boards 908 may display the same contents (for example, all empty sections in the parking lot 904), or may display different contents. For example, each guidance bulletin board 908 may display only an empty section where it is desired to guide a vehicle traveling in the vicinity thereof. Each guidance bulletin board 908 may display information other than the empty section such as the traveling direction of the vehicle. Which contents to display on each guidance display board 908 in what situation is determined based on the result of learning described later.

The operation determining unit 205 may perform a learning process for optimizing the operation determination at any timing. Specifically, the operation determining unit 205 may learn what kind of information is provided to the vehicle and what kind of vehicle flow occurs from the past record and the like. The operation determining unit 205 may search for a method of providing information (for example, a display method on the guidance display board 908) with which appropriate control is performed by simulation. At this time, the KPI set in the parking lot control system 901 may be, for example, the usage efficiency of the parking lot 904 or the satisfaction of a person using the parking lot 904. Then, the operation executing unit 206 provides optimal information to the vehicle in an optimal manner. The flow of these kinds of process is the same as that of the control system 101 illustrated in FIG. 5.

According to Example 3 described above, the parking position and the travel route to the parking position are optimized so that the KPI (for example, to minimize fuel consumption) of the self-driving vehicle 902 is improved. The parking position and the travel route to the parking position are optimized so that each KPI (for example, it is desired to park early, park near a person's exit, or park in the shade) of the vehicle 903 driven by a person is improved. It is difficult to obtain such an effect even if each self-driving vehicle 902 and each vehicle 903 driven by a person directly exchange information with each other in an autonomous body system that does not include the parking lot control system 901.

Example 4

Next, Example 4 of the present invention will be described. Except for the differences described below, each unit of the autonomous body system of Example 4 has the same functions as each unit denoted by the same reference numerals of Example 1 illustrated in FIGS. 1 to 7, and description thereof will be omitted.

FIG. 10 is an explanatory diagram illustrating an overall configuration of an autonomous body system 1000 according to Example 4 of the present invention.

The autonomous body system 1000 of Example 4 is a construction machine system including an excavator 1002, a dump truck 1003, a person 1004, and a construction site control system 1001 for controlling the same as autonomous bodies.

The construction site control system 1001 monitors the interference and the possibility of interference of autonomous bodies (for example, excavator car 1002, dump truck 1003, and person 1004) at a construction site and performs appropriate control (presentation of information) on each autonomous body. The construction site control system 1001 monitors the situation (for example, situation of excavated holes or situation of materials used for construction) of the construction site other than the autonomous bodies and performs appropriate control (presentation of information) on each autonomous body.

FIG. 10 illustrates one excavator 1002, one dump truck 1003, and one person 1004 as autonomous bodies included in the autonomous system 1000 for the sake of simple description, but these are examples, and the autonomous system 1000 may include a plurality of excavators 1002, a plurality of dump trucks 1003, a plurality of people 1004, may not include at least one thereof, or may include other construction machines such as one or more bulldozers.

At least one of the one or more excavator 1002 and the one or more dump trucks 1003 may be a construction machine (hereafter, referred to as autonomous construction machine) that operates autonomously without human operation (or by supporting human operation), and any of the other may be a general construction machine (hereinafter, also referred to as a general construction machine) operated by a person.

The configuration of the autonomous construction machine may be the same as the configuration of the wing vehicle 102 illustrated in FIG. 3 or the forklift 103 illustrated in FIG. 4, for example. Here, FIG. 3 is referred. The situation grasping unit 306 of the autonomous construction machine grasps the situation around the autonomous construction machine at the construction site as surrounding situation via the sensor unit 303 of the autonomous construction machine, such as a camera.

The surrounding situation grasped as such includes information provided from the construction site control system 1001. This information may include information such as whether there is another autonomous body in the vicinity of the autonomous construction machine and whether another autonomous body is approaching. The operation determining unit 307 determines an operation such as excavation or transportation based on the grasped situation and the task information 310 (for example, information on excavation or transportation operations to be performed from now on), and the operation executing unit 308 executes the determined operation via the drive unit 304.

The configuration of the general construction machine may be the same as the configuration of the wing vehicle 102 illustrated in FIG. 3 or the forklift 103 illustrated in FIG. 4, for example. Here, FIG. 3 is referred. However, the general construction machine may not include the processor 301, the communication interface 302, the sensor unit 303, and the storage device 305. Sensory organs (for example, eyes and ears) of a driver of the general construction machine corresponds to the sensor unit 303 of the autonomous construction machine. The intelligence of the driver of the general construction machine corresponds to the situation grasping unit 306, the operation determining unit 307, and the operation executing unit 308 of the autonomous construction machine. Information corresponding to the task information 310 (for example, information on excavation or transportation operations to be performed from now on) may be remembered by the driver.

The driver of the general construction machine grasps the situation around the general construction machine at the construction site as surrounding situation through his or her own sensory organs. The surrounding situation grasped as such includes information (for example, information on the approach of other autonomous bodies similar to the above) provided from the construction site control system 1001.

Based on the grasped situation and information corresponding to the task information 310, the driver determines an operation such as excavation or transportation and executes the determined operation via the drive unit 304.

The KPI set in the autonomous construction machine and the general construction machine may be, for example, that it is desired to work efficiently or to work reliably. Different KPIs may be set for each construction machine.

The person 1004 grasps the surrounding situation by using sensory organs such as eyes and ears, determines an operation (for example, to continue current work, avoid surrounding objects (for example, other autonomous bodies approaching), or reconfirm the surroundings), and performs the determined operation. The surrounding situation grasped by the person 1004 includes information provided from the construction site control system 1001 (for example, information related to the same as described above).

If the person 1004 is an operator who performs construction work at the construction site, the KPI of the person 1004 may be, for example, that it is desired to work efficiently, to work reliably, or not to get tired. If the person 1004 is a person other than a worker (for example, a person who observes the construction site or a person who delivers an article (for example, a lunch box) to the worker), it may be desired to achieve each objective efficiently and reliably, for example.

The configuration of the construction site control system 1001 is the same as the configuration of the control system 101 of Example 1 illustrated in FIG. 2. The situation grasping unit 204 of the construction site control system 1001 grasps the overall situation (for example, the situation of each autonomous body such as the excavator 1002, the dump truck 1003, and the person 1004, and the situation of holes and materials in the construction site) of the construction site as surrounding situation via, for example, one or more cameras 105. Here, each camera 105 may be a fixed camera installed in an appropriate place or may be a camera that moves like a drone with a camera. The camera 105 is an example of a sensor for grasping the situation of the autonomous body system 1000, and other types of sensors may be used.

The task information 208 of the construction site control system 1001 may be information relating to work (for example, excavation and transportation) to be executed at the construction site. The operation determining unit 205 of the construction site control system 1001 determines each control content so that the cooperative work of each autonomous body is performed efficiently and reliably, based on the situation of the construction site grasped from the image captured by the camera 105 and the task information 208. Here, the cooperative work of each autonomous body is, for example, that soil excavated by the excavator 1002 is put into the dump truck 1003 and the person 1004 shapes a hole generated by the excavation.

Then, the operation executing unit 206 performs the determined control. Control is performed by presenting information to each autonomous body. For example, the traffic signal 106 similar to that of Example 1 may be provided in the construction site, or necessary information may be provided to each autonomous body by voice.

The operation determining unit 205 may perform a learning process for optimizing the operation determination at any timing. Specifically, the operation determining unit 205 may learn what kind of information is provided to each of the autonomous bodies, what operation each autonomous body performs, and how the behavior will be as a whole, from the performance or the like. The operation determining unit 205 may search for a method of providing information with which appropriate control is performed by simulation. Here, the KPI set in the construction site control system 1001 may be the work efficiency of the construction site, for example. Then, the operation executing unit 206 provides optimal information to each autonomous body in an optimal manner. The flow of these kinds of process is the same as that of the control system 101 illustrated in FIG. 5.

According to Example 4 described above, the operation of the autonomous construction machine is optimized from the viewpoint of efficiency according to the situation of other autonomous bodies and the site. Similarly, the operation of a general construction machine is optimized from the viewpoint of efficiency according to the situation of other autonomous bodies and the site. The operation of the worker or a person other than the worker is optimized from the viewpoint of efficiency and fatigue according to the situation of other autonomous bodies and the site.

It is difficult to obtain such an effect even if each autonomous body directly exchanges information with each other in an autonomous body system that does not include the construction site control system 1001. This is due to the following reasons, for example. That is, there is a possibility that a difference may occur between the situation grasped by each autonomous body and the actual situation. Although it is necessary to determine a communication means for each other in advance, since the provider and the operator of each autonomous body are generally different, it is actually difficult to determine the communication means.

Example 5

Next, Example 5 of the present invention will be described. Except for the differences described below, each unit of the autonomous body system of Example 5 has the same functions as each unit denoted by the same reference numerals of Example 1 illustrated in FIGS. 1 to 7, and description thereof will be omitted.

FIG. 11 is an explanatory diagram illustrating an overall configuration of the autonomous system 1100 according to Example 5 of the present invention.

An autonomous system 1100 of Example 5 is a screw tightening robot system that combines two workpieces (parts to be processed) and tightens the workpieces with a screw. The autonomous body system 1100 includes a screw tightening monitoring system 1101, a first hand robot 1102, and a second hand robot 1103 as autonomous bodies.

The first hand robot 1102 places a first workpiece 1104 on a work table 1107, and then places a second workpiece 1105 on the first workpiece 1104 and stops as it is.

The second hand robot 1103 inserts a screw 1106 into a screw hole 1108 of the first workpiece 1104 and the second workpiece 1105, and a screw tightening device 1109 attached to the tip of the arm of the second hand robot 1103 tightens the screw 1106.

The screw tightening monitoring system 1101 monitors the displacement of the position on which the second workpiece 1105 is placed, a screw tightening failure, and the like and performs appropriate control (presentation of information) on the first hand robot 1102 and the second hand robot 1103.

The configurations of the first hand robot 1102 and the second hand robot 1103 may be the same as, for example, the configuration of the wing vehicle 102 illustrated in FIG. 3 or the forklift 103 illustrated in FIG. 4. Regarding the portion omitted in the following description, the description regarding the arm robot 802 of Example 2 may be applied. Here, FIG. 3 is referred to regarding the configuration of the first hand robot 1102, and FIG. 4 is referred to regarding the configuration of the second hand robot 1103.

The situation grasping unit 306 of the first hand robot 1102 grasps the state of the first workpiece 1104, the state of the second workpiece 1105, and the state of the work table 1107 as surrounding situations, for example, via the sensor unit 303 of the first hand robot 1102, such as a camera attached to the first hand robot 1102.

The situation grasped by the situation grasping unit 306 includes information provided from the screw tightening monitoring system 1101. The information includes, for example, information on the displacement of the fixed position of each workpiece and the completion or failure of a screw tightening operation. The operation determining unit 307 determines an operation such as taking out each workpiece from the storage location and fixing each workpiece to a predetermined position on the work table 1107 based on the grasped situation and the task information 310 (for example, information on screw tightening work to be performed from now on), and the operation executing unit 308 executes the determined operation via the drive unit 304.

The KPI set in the first hand robot 1102 is, for example, that it is desired to work efficiently.

The situation grasping unit 406 of the secondhand robot 1103 grasps the situation of the screw hole 1108, the screw 1106, and the screw fastening device 1109 as surrounding situation, for example, via the sensor unit 403 of the second hand robot 1103, such as a camera attached to the second hand robot 1103.

The situation grasped by the situation grasping unit 406 includes information provided from the screw tightening monitoring system 1101. The information includes, for example, whether each workpiece is in a state where a screw tightening operation can be started, and information on the completion or failure of the screw tightening operation. The operation determining unit 407 determines an operation such as insertion of the screw 1106 into the screw hole 1108 and screw tightening by the screw tightening device 1109 based on the grasped situation and task information 410 (for example, information on screw tightening work to be performed from now on), and the operation executing unit 408 executes the determined operation via the drive unit 404.

The KPI set in the second hand robot 1103 is, for example, that it is desired to work efficiently and that the screw tightening is successful.

The configuration of the screw tightening monitoring system 1101 is the same as the configuration of the control system 101 of Example 1 illustrated in FIG. 2. The situation grasping unit 204 of the screw tightening monitoring system 1101 grasps, for example, the state (for example, whether the screw holes overlaps) of the first workpiece 1104 and the second workpiece 1105, and the situation of the first hand robot 1102 and the second hand robot 1103 as surrounding situations via one or more cameras 105, for example. Here, the camera 105 is, for example, one or more cameras installed in an appropriate place where images of each workpiece and hand robot can be captured. The camera 105 is an example of a sensor for grasping the situation of the autonomous body system 1100, and other types of sensors may be used.

The task information 208 of the screw tightening monitoring system 1101 is information relating to a screw tightening operation to be executed, for example. The operation determining unit 205 of the screw tightening monitoring system 1101 determines the control contents of the first hand robot 1102 and the second hand robot 1103 based on the situation grasped from the image captured by the camera 105 and the task information 208.

For example, the operation determining unit 205 may grasp the situation of two workpieces (for example, whether the screw holes are placed with each other overlapped) and determine to notify the first hand robot 1102 of a correction instruction for the position of the second workpiece 1105 depending on the situation. For example, when the screw holes of two workpieces overlap, the screw tightening operation can be executed, the operation determining unit 205 may determine to notify the secondhand robot 1103 of the fact. The operation determining unit 205 may grasp that the screw tightening succeeded or failed, and when the screw tightening fails, may determine to notify the second hand robot 1103 of redoing.

Then, the operation executing unit 206 performs a determined control. The control is performed by information presentation to each autonomous body (for example, transmission of information via the network 210).

The operation determining unit 205 may perform a learning process for optimizing the operation determination at any timing. Specifically, the operation determining unit 205 may learn what kind of information is provided to each hand robot and what results (success or failure) of the screw tightening operation will be, and how long it will take to work, from the record or the like. Here, the KPI set in the screw tightening monitoring system 1101 may be, for example, that it is desired to work efficiently and screw tightening is successful. The flow of these kinds of process is the same as that of the control system 101 illustrated in FIG. 5.

According to Example 5 described above, the operation of the first hand robot 1102 is appropriate from the viewpoint of successful screw tightening. The operation of the second hand robot 1103 becomes efficient (for example, the waiting time is short and the possibility of failure is low).

It is difficult to obtain such an effect even if each hand robot directly exchanges information with each other in an autonomous system that does not include the screw tightening monitoring system 1101. This is due to the following reasons, for example. That is, there is a possibility that a difference may occur between the situation grasped by each hand robot and the actual situation. Each hand robot may not be able to observe the situation.

The present invention is not limited to the above-described examples and includes various modification examples. For example, the above-described examples have been described in detail for better understanding of the present invention and are not necessarily limited to those having all the configurations described. A part of the configuration of one example can be replaced with the configuration of another example, and the configuration of another example can be added to the configuration of one example. It is possible to add, delete, and replace other configurations for a part of the configuration of each example.

Each of the above-described configurations, functions, processing units, processing means, and the like may be realized by hardware by designing a part or all thereof with, for example, an integrated circuit. Each of the above-described configurations, functions, and the like may be realized by software by a processor interpreting and executing a program that realizes each function. Information such as programs, tables, and files that realize each function can be stored in a data storage medium such as a non-volatile semiconductor memory, a hard disk drive, a solid state drive (SSD), or a computer-readable non-transitory data storage medium such as an IC card, SD card, or DVD.

The control lines and information lines indicate what is considered necessary for the description, and not all the control lines and information lines are necessarily illustrated on the product. Actually, it may be considered that almost all the components are connected to each other.

What is claimed is:

1. An autonomous body system comprising a plurality of autonomous bodies, wherein
    each of the plurality of autonomous bodies includes a situation grasping unit that grasps situation, an operation determining unit that determines an operation based on the grasped situation, and an operation executing unit that executes the determined operation,
    the plurality of autonomous bodies included in the autonomous body system includes one or more first autonomous bodies and two or more second autonomous bodies,
    situation grasped by the situation grasping unit of the first autonomous body includes situation of the second autonomous body,
    the situation grasped by the situation grasping unit of the second autonomous body includes a result of an operation executed by the operation executing unit of the first autonomous body,
    the operation determining unit of the second autonomous body determines an operation based on the result of the operation executed by the operation executing unit of the first autonomous body, and
    the operation determining unit of the first autonomous body determines an operation of the first autonomous body so that an evaluation parameter to be calculated based on the situation grasped by the situation grasping unit of the first autonomous body becomes a value indicating high evaluation.

2. The autonomous body system according to claim 1, wherein
    the operation determining unit of the first autonomous body stores a function for determining an operation based on the situation grasped by the situation grasping unit of the first autonomous body and changes the parameter of the function so that the evaluation parameter becomes a value indicating high evaluation.

3. The autonomous body system according to claim 1, wherein
    the operation determining unit of the second autonomous body determines an operation of the second autonomous body so that an evaluation parameter to be calculated based on the situation grasped by the situation grasping unit of the second autonomous body becomes a value indicating high evaluation.

4. The autonomous body system according to claim 3, wherein
    the situation grasped by the situation grasping unit of the second autonomous body includes the result of the operation executed by the operation executing unit of the first autonomous body, and other situations, and
    the operation determining unit of the second autonomous body stores a function for determining an operation based on the result of the operation executed by the operation executing unit of the first autonomous body and the other situations and changes the parameter of the function so that the evaluation parameter becomes a value indicating high evaluation.

5. The autonomous body system according to claim 4, wherein
    the parameter of the function includes a weight given to each of the result of the operation executed by the operation executing unit of the first autonomous body and the other situations.

6. A control method of an autonomous body system including a plurality of autonomous bodies, wherein
    each of the plurality of autonomous bodies includes a situation grasping procedure for grasping situation, an operation determining procedure for determining an operation based on the grasped situation, and an operation executing procedure for executing the determined operation,
    the plurality of autonomous bodies included in the autonomous body system includes one or more first autonomous bodies and two or more second autonomous bodies,
    situation that the first autonomous body grasps in the situation grasping procedure includes situation of the second autonomous body,
    situation that the second autonomous body grasps in the situation grasping procedure includes a result of an operation executed in the operation executing procedure of the first autonomous body,
    the second autonomous body determines an operation based on the result of the operation executed in the operation executing procedure of the first autonomous body, in the operation determining procedure, and the first autonomous body determines an operation of the first autonomous body so that an evaluation parameter to be calculated based on the situation grasped in the situation grasping procedure of the first autonomous body becomes a value indicating high evaluation, in the operation determining procedure.

7. The control method according to claim 6, wherein the first autonomous body stores a function for determining an operation based on the situation grasped in the situation grasping procedure of the first autonomous body and changes the parameter of the function so that the evaluation parameter becomes a value indicating high evaluation, in the operation determining procedure.

8. The control method according to claim 6, wherein the second autonomous body determines an operation of the second autonomous body so that an evaluation parameter to be calculated based on the situation grasped in the situation grasping procedure of the second autonomous body becomes a value indicating high evaluation, in the operation determining procedure.

9. The control method according to claim 8, wherein the situation grasped in the situation grasping procedure by the second autonomous body includes the result of the operation executed in the operation executing procedure of the first autonomous body, and other situations, and
the second autonomous body stores a function for determining an operation based on the result of the operation executed in the operation executing procedure of the first autonomous body and the other situations and changes the parameter of the function so that the evaluation parameter becomes a value indicating high evaluation, in the operation determining procedure.

10. The control method according to claim 9, wherein the parameter of the function includes a weight given to each of the result of the operation executed in the operation executing procedure of the first autonomous body and the other situations.

11. An autonomous body system comprising a plurality of autonomous bodies, wherein
each of the plurality of autonomous bodies includes a situation grasping unit that grasps situation, an operation determining unit that determines an operation based on the grasped situation, and an operation executing unit that executes the determined operation,
the plurality of autonomous bodies included in the autonomous body system includes one or more first autonomous bodies and two or more second autonomous bodies,
situation grasped by the situation grasping unit of the first autonomous body includes situation of the second autonomous body,
the situation grasped by the situation grasping unit of the second autonomous body includes a result of an operation executed by the operation executing unit of the first autonomous body,
the operation determining unit of the second autonomous body determines an operation based on the result of the operation executed by the operation executing unit of the first autonomous body, and
the operation determining unit of the second autonomous body determines an operation of the second autonomous body so that an evaluation parameter to be calculated based on the situation grasped by the situation grasping unit of the second autonomous body becomes a value indicating high evaluation.

12. A control method of an autonomous body system including a plurality of autonomous bodies, wherein
each of the plurality of autonomous bodies includes a situation grasping procedure for grasping situation, an operation determining procedure for determining an operation based on the grasped situation, and an operation executing procedure for executing the determined operation,
the plurality of autonomous bodies included in the autonomous body system includes one or more first autonomous bodies and two or more second autonomous bodies,
situation that the first autonomous body grasps in the situation grasping procedure includes situation of the second autonomous body,
situation that the second autonomous body grasps in the situation grasping procedure includes a result of an operation executed in the operation executing procedure of the first autonomous body,
the second autonomous body determines an operation based on the result of the operation executed in the operation executing procedure of the first autonomous body, in the operation determining procedure, and
the second autonomous body determines an operation of the second autonomous body so that an evaluation parameter to be calculated based on the situation grasped in the situation grasping procedure of the second autonomous body becomes a value indicating high evaluation, in the operation determining procedure.

* * * * *